United States Patent
Smith et al.

(10) Patent No.: US 11,142,654 B2
(45) Date of Patent: Oct. 12, 2021

(54) COMPOSITION AND PROCESS FOR THE GENERATION OF A CLEAR OR TRANSLUCENT EMISSIVE COATING

(75) Inventors: Noel Smith, Hackettstown, NJ (US); Charles J. Gruszka, Chalfont, PA (US); Aaron Thompson, Rahway, NJ (US); Michael Deemer, Pulaski, PA (US)

(73) Assignee: Chemetall GmbH, Frankfurt (DE)

( * ) Notice: Subject to any disclaimer, the term of this patent is extended or adjusted under 35 U.S.C. 154(b) by 630 days.

(21) Appl. No.: 12/938,529

(22) Filed: Nov. 3, 2010

(65) Prior Publication Data
US 2012/0107625 A1    May 3, 2012

(51) Int. Cl.
*C09D 5/33* (2006.01)
*C09D 7/61* (2018.01)
*C09D 7/40* (2018.01)

(52) U.S. Cl.
CPC .............. *C09D 5/004* (2013.01); *C09D 7/61* (2018.01); *C09D 7/70* (2018.01); *Y10T 428/251* (2015.01); *Y10T 428/31663* (2015.04)

(58) Field of Classification Search
CPC . C09D 5/004; C09D 5/36; C09D 7/61; C09D 7/70; C08L 23/0876; Y10T 428/251
See application file for complete search history.

(56) References Cited

U.S. PATENT DOCUMENTS

| | | | |
|---|---|---|---|
| 5,776,604 A * | 7/1998 | Lu | B41M 1/30 427/412.3 |
| 6,602,340 B1 | 8/2003 | Schank et al. | |
| 7,713,587 B2 | 5/2010 | Finley et al. | |
| 2002/0146515 A1 * | 10/2002 | Schwartz et al. | 427/409 |
| 2004/0022950 A1 * | 2/2004 | Jung et al. | 427/385.5 |
| 2005/0126441 A1 | 6/2005 | Skelhorn | |
| 2006/0128867 A1 * | 6/2006 | Marx | B82Y 30/00 524/445 |
| 2006/0241232 A1 | 10/2006 | Garces et al. | |
| 2008/0248201 A1 * | 10/2008 | Corkery | C09D 7/62 427/256 |
| 2009/0087674 A1 | 4/2009 | Slawikowski et al. | |
| 2010/0104809 A1 | 4/2010 | Duda et al. | |
| 2010/0183861 A1 | 7/2010 | Ogawa | |
| 2012/0057224 A1 | 3/2012 | Story et al. | |

FOREIGN PATENT DOCUMENTS

| | | | |
|---|---|---|---|
| AU | 2009307557 B2 | 4/2010 | |
| JP | S57165466 A | 10/1982 | |
| JP | 2002508497 A | 3/2002 | |
| JP | 2010099959 A | 5/2010 | |
| JP | 2010540748 A | 12/2010 | |
| WO | WO 9856861 A1 * | 12/1998 | ........... C09D 7/1291 |
| WO | 2004/101691 A2 | 11/2004 | |
| WO | 2009/045267 A1 | 4/2009 | |
| WO | 2009/048515 A1 | 4/2009 | |
| WO | 2009/084117 A1 | 7/2009 | |

OTHER PUBLICATIONS

Wypych, Handbook of Fillers—Section 5, 2000, ChemTec Publishing, 2nd edition, pp. 241-303.*
Wypych, Handbook of Fillers—Section 2, 2000, ChemTec Publishing, 2nd edition, pp. 15-177.*
DuPont™ Tyzor® brochure, 2001, downloaded on Feb. 1, 2016 from http://snf.stanford.edu/pipermail/specmat/attachments/20050518/4f890d57/attachment-0002.pdf.*
Kojima et al., Mechanical properties of nylon 6-clay hybrid, J. Mater. Res., vol. 8, No. 5, May 1993, pp. 1185-1189 (Year: 1993).*
Becheri et al., Synthesis and characterization of zinc oxide nanoparticles: application to textiles as UV-absorbers. J Nanopar Res (2008) 10:679-689. (Year: 2007).*
Arnold Schwarzenegger; "2008 Building Energy Efficiency Standards for Residential and Nonresidential Buildings" California Energy Commission Regulations/Standards; Title 24, Part 6, of the California Code of Regulations; Dec. 31, 2008 (Dec. 31, 2008); Retrieved from the Internet: URL:http://www.energy.ca.gov/2008publications/CEC-400-2008-001/CEC-400-2008-001-CMF.PDF, [retrieved on Jan. 27, 2012]; 176 pages.

* cited by examiner

*Primary Examiner* — Elizabeth A Robinson
(74) *Attorney, Agent, or Firm* — Armstrong Teasdale LLP

(57) ABSTRACT

A composition for applying a clear or translucent and colorless or nearly colorless emissive coating on a metallic surface comprising in a dispersion a) 50 to 300 g/L of at least one of clear or translucent organic polymeric substances of a binder, and b) 30 to 300 g/L of sheet silicate pigments having a TE value for the thermal emissivity of at least 0.40, having a particle size distribution of which $d_{50}$ is in the range of 0.3 to 80 μm. Processes for applying the composition and elements prepared therefrom are also disclosed.

3 Claims, No Drawings

COMPOSITION AND PROCESS FOR THE GENERATION OF A CLEAR OR TRANSLUCENT EMISSIVE COATING

FIELD OF THE INVENTION

This invention relates to a composition and method glass article or any glass window for applying a clear or translucent emissive coating especially for cool roofing elements having a metallic surface.

BACKGROUND OF THE INVENTION

Energy saving and environmental protection are an important topic in many countries. Within such targets, cool roofing of buildings is one of the fields. In the United States of America, a variety of standards has been developed how to control and to measure energy losses as well as energy savings.

Emissive coatings show a reduced absorption of electromagnetic radiation. They are seeked to reduce the amount of heat transfer from solar irradiance by absorption to transmission and to increase the amount of heat to be reflected.

A cool roof has a cool element that reflects the heat of the sun light and emits absorbed radiation back into the atmosphere in a higher degree than conventional. The cool element allows that the cool element and the thermally protected object like the cool roof stays cooler and reduces the amount of heat transferred to the thermally protected object like a building or an inner space of a transportation unit keeping the thermally protected object cooler and at a more constant temperature. It is estimated that if there would be used nationwide cool roofs over U.S.A., there would occur annual savings of about 1 billion US-$.

For gaining a cool roof and similar cool elements, the following effects have to be considered: Solar reflectance, thermal emissivity of energy which is initially absorbed and not reflected and then radiated, thermal resistance to resist the flow of heat into the interior, thermal mass e.g. to absorb solar energy during the day and emit it in the night, some heat to be absorbed and transferred into the interior, water transpiration especially of porous or vegetated roof surfaces, convection because of wind as well as the slope of the roof. Further on, especially the construction type, the occupancy type and the product density influence the thermal conditions. Such conditions can be transferred to similar applications like for cool elements or for inflammable elements or both like e.g. elements of aeroplanes, of automobiles, of bicycles, of flying objects, of ships, of trains, of rockets, of satellites, of exterior antennae, of exterior architectural elements, of guard-rail elements, of tanks, of chemical plant elements, of textile elements, of papers or wall-papers, of plastics' materials containing elements, of wood-containing elements, of other coated elements, of painted and emissively coated elements, of coated elements made of glass, metallic materials, organic materials etc. The reduction of heat of buildings and further thermally protected objects like transportation units may contribute to reduce urban temperatures and air pollution e.g. by smog. Therefore, cool elements may contribute in several aspects to enhance the quality of life.

The solar energy is typically distributed to about 5% of ultraviolet light of about 290-400 nm, to about 42% of visible light of about 400-700 nm and to about 53% of near-infrared radiation of about 700-2500 nm. The last portion of the radiation causes the thermal influence significantly.

Highly reflective roof surfaces can reflect solar energy into the atmosphere away from the building interior and away from the ambient air around the building. Reflectance may be measured on a scale from 0 to 1 or from 0 to 100% as SR or TSR (Solar Reflectance resp. Total Solar Reflectance), e.g. by ASTM C-1549-04, ASTM E 903 and ASTM E 1918. At a value of 1, the coating and the thermally protected object are most reflective.

In addition to reflecting solar energy into the atmosphere, roofs also radiate (emit) thermal energy back to the atmosphere. This energy portion which is initially absorbed and not reflected, but then emitted is characterized by the Thermal Emissivity TE. Thermal emittance M is measured in watts per square meter ($W/m^2$). But thermal emittance and thermal emissivity are spectrum-dependent abilities of a material, of a coating or of an object to release absorbed heat. Thermal emissivity TE may be measured as a scale factor on a scale from 0 to 1, e.g. by ASTM C-1371-04a and ASTM E 408. At a value of 1, the coating and the thermally protected object are most emissive.

It is used along with temperature to calculate emittance for a given material, coating or object.

The Solar Reflectance Index SRI is a newer measurement characteristic which incorporates both TSR and TE in a single value. SRI quantifies how hot a surface would get relative to standard black and standard white surfaces. SRI is defined such that a standard black (reflectance 0.05, emittance 0.90) is 0 and that a standard white (reflectance 0.80, emittance 0.90) is 100. The white standard effects both the TRS and TE while the black standard effects only the TE in the SRI calculation. SRI is typically measured in accordance with ASTM E 1980-01. Very hot materials may have negative SRI data, whereas very cool materials may show SRI data greater than 100. Coatings with the highest SRI values are the coolest choice for exterior applications.

Of these data, SRI is most important, as it is an integral characteristic for both other data. Reflecting metallic surfaces like polished metal surfaces have a very low emissivity. SRI is most affected by TSR, as TSR is defined via white and black standards.

If TE and/or TSR are varied, SRI may be varied too. On the other hand, there may be selected varied data of TE and TSR to gain the same SRI values—Table 1. The high values of both TSR and TE for white skews the SRI to the "brighter" reference, to white.

The emissive coatings with the highest SRI data absorb the smallest amount of energy during solar terrestrial irradiance. Therefore, emissive coatings with the highest SRI data seem to be the best choice for exterior application.

Measures involving non-aged or new or only slightly aged reflective coatings may be considered relatively simply compared to similar measures involving aged coatings. With aged coatings, many complexities have to be noticed. For practice in the scope of this patent application, the data of TE, TSR and SRI are to be considered for coatings respectively elements with coatings in a new status as well as in an aged status without further differentiation, if and how aging occurs and if and how thermal data are changing during this aging. Of these characteristics, TE and SRI are most important.

Thermal emissivity is a surface phenomenon and as such the surface when coated with an emissive coating has the emissive quality of the emissive coating.

For cold roofing, the requirements of California Title 24, the 2008 Building Energy Efficiency Standards, Title 24, Part 6, may be taken best. Title 24 states a minimum TE of 0.75 for a minimum of 3 year aged TSR of 0.55 and for a minimum SRI of 64 on non residential low slope roofs.

Despite all efforts for cool roofing elements and for similar cool elements, there is a lack of clear or translucent emissive coatings e.g. on metallic elements like metallic sheets for example made from Galvalume®, Galfan®, Galvanneal® or any type of zinc or zinc containing alloy or aluminum alloy coated steel. And there is a lack of clear or translucent emissive coatings to be used in different applications, e.g. on glass, wood, painted substrates etc. If there are similar coatings and elements known up to now, to the best knowledge of the applicant, these coatings are white, grey, black or intensively colored, but they are not clear and not translucent emissive coatings. Many producers of metallic elements for architectural use would like to produce colorless or only slightly colored translucent or even better clear coatings so that the structure of the metallic surface is well visible like zinc flowers of the metallic surface even with the naked eye.

The thermal requirements may be compared best with California Energy Commission adopted California's Building Energy Efficiency Standard, Title 24, as shown in Table 1.

The thermal properties of the emissive coating for a cool element may be characterized by: 1.) The thermal emissivity TE to be measured in accordance with ASTM C-1371-04a. 2.) The total solar reflectance TSR to be measured in accordance with ASTM C-1549-04. 3.) The solar reflectance index SRI calculated in accordance with ASTM E 1980-01 from TE and TSR data.

Two materials, two coatings or two objects can be identical in visible color, yet have very different reflectance characteristics in the Infrared spectrum. Those that reflect and emit IR (=infrared) light will remain significantly cooler than those that absorb it. And because IR light comprises fully half of sunlight, the IR-reflectivity of an object is even more important than its color, when it comes to heat build-up. In other words, an object does not need to be white to be cool.

First approaches to suggest compositions and processes for translucent or clear emissive coatings lead to disappointing results, as TE and SRI values were much too low and as these coated elements absorb too much heat from solar terrestrial irradiance:

According to present experience, over 3.5 years of solar irradiance, the data for TE remain typically in about the same and the data for TSR decrease typically of about 0.1, whereas the data for SRI typically drop by about 15%.

Such metallic sheets for architectural use, which may be made e.g. of Galvalume®, are often seeked to additionally fulfill the following high requirements for corrosion resistance and long term stability, but further on no discoloration and no significant change of TSR values, especially over 3.5 years of outdoor exposition: 1000 hours with <5% white rust tested with Neutral Salt Spray Test NSS in accordance with ASTM B 117, 1000 hours with 0% white rust tested with Humidity Test in accordance with ASTM D 1735, 2000 hours with no red edge rust and with no blackening with Butler Water Immersion Test according to ASTM A239 as well as 2000 hours with <5% white rust tested with Wet Stack Test in accordance with ASTM D 7376.

Further on, it would be fine if such emissive coatings would show a high UV light resistance or a low coefficient of friction or even both.

The cool elements that shall bear such emissive coatings may be any elements, especially if they shall be used in any environment with any thermal irradiance. Especially if they are of any metallic material, they may be for example flat sheets, corrugated sheets, castings, foils, formed parts, joined parts, moulded parts, moulded shapes, profiles, supports and tubes. If they are of any material like glass, metallic material, paper, plastics' material, natural material like wood or any combination thereof, they may be for example windows, doors, frames, roof elements, chimney elements, wall elements, support elements, construction elements, casings, frames, devices, furniture, fence elements, joined elements, lamps, masts, protection elements, tanks, transportation units and windmill elements.

It has been found that emissive coatings on Galvalume® and similar metallic materials according to the present invention improve the thermal emissivity TE from the range of from about 0.06 to about 0.25 to the range of from about 0.40 or of from about 0.55 or of from about 0.65 to about 0.90. It has been found that they reduce the total solar reflectance significantly or mask the spangle of the significantly or even both.

US 20100104809 A1 teaches cool roof coverings comprising a water resistant styrene-acrylic emulsion polymer,

TABLE 1

Comparison for thermal data of different emissive coatings of the state of the art in comparison to the present invention and their surface temperatures at solar terrestrial irradiance for low slope roofing and different wind conditions

| Coatings | TE | TSR | SRI * in % | $T_{surface}$ ° C. * |
|---|---|---|---|---|
| Requirements according to California Standard Title 24 | ≥0.75# | ≥0.55# | ≥64# | — |
| Variation 1 of TE for SRI = 64 | 0.85 | 0.55 | 64 | — |
| Variation 2 of TSR for SRI = 64 | 0.75 | 0.575 | 64 | — |
| white coating 1 | 0.90 | 0.80 | 99-100 | 49-41 |
| white coating 2 | 0.90 | 0.90 | 114 | 41-38 |
| grey coating 1 | 0.90 | 0.43 | 49-50 | 77-51 |
| grey coating 2 | 0.85 | 0.40 | 41-44 | 81-52 |
| orange, red, green or blue cool coatings | about 0.85 | about 0.25 to 0.40 | about 20 to 45 | 73-65 |
| black coating | about 83 | about 0.25 | about 22.5 | about 73 |
| clear colorless coating - state of the art without mica | 0.25 | 0.67 | 44-71 | 80-47 |
| clear colorless coating - present invention with mica | 0.70 | 0.68 | 78 | 67-34 | after minimum 3.5 years of solar irradiance
* data depending on low or high wind condition for low slope-roofing, but low wind and low slope roofing are more sensitive at least one reflective pigment on the base of transition metal oxide, barium sulfate or zinc sulfide, a flame retardant, and a light weight filler. It is directed to roofing materials having a reduced amount of VOC (VOC=volatile organic compounds). The coverings are intensively colored or white, as there is used a high amount of intensively colored or white pigment. U.S. Pat. No. 7,713,587 B2 teaches multiple translucent layers on glass, of which one is at least an infrared reflective layer, which may consist e.g. of silver of e.g. 3 nm thickness.

It would be highly advantageous to have a composition to be able to generate emissive coatings that are clear or at least translucent that may be used for cool roofings. Therefore there is further on the object to propose a method of coating e.g. of metallic surfaces that may be used for cool roofings. And there is an object to apply such emissive coatings for other purposes than cool roofings. Further on, it may be an object to propose such emissive coatings that may be easily produced and are not too expensive.

SUMMARY OF THE INVENTION

According to the present invention, there is provided a composition for applying a clear or translucent and colorless or nearly colorless emissive coating especially for cool roofing preferably on a metallic surface comprising in a dispersion, a) 50 to 300 g/L of at least one of clear or translucent organic polymeric substances a) of a binder, and b) 30 to 300 g/L of sheet silicate pigments b) having a TE value for the thermal emissivity of at least 0.40, having a particle size distribution of which the average particle size $d_{50}$ is in the range of 0.3 to 80 μm and having been comminuted, disintegrated, exfoliated or any combination of these to thin particles.

According to the present invention, there is further on provided a process for applying a clear or translucent and colorless or nearly colorless emissive coating especially for cool roofing on a metallic surface wherein a composition of the invention is applied on a substrate surface, wherein the coating is dried and wherein the dried coating has a coating weight in the range of from 0.2 to 2000 g/m².

There is further on provided a clear or translucent and colorless or nearly colorless emissive coating as prepared with a composition of the invention.

There is further on provided a cool element like a cool roofing element that comprises a metallic substrate having an upper surface as well as a clear or translucent and colorless or nearly colorless emissive coating on at least a portion of the upper surface of the substrate, wherein the coating is a dried film of the composition of the invention wherein the emissive coating has 1.) a thermal emissivity TE in accordance with ASTM C-1371-04a of at least 0.40, 2.) a total solar reflectance TSR in accordance with ASTM C-1549-04 of at least 0.40, of at least 0.50 or of at least 0.55 and/or 3.) a solar reflectance index SRI calculated in accordance with ASTM E 1980-01 of at least 40% or at least 60%.

There is further on provided an emissive coating as prepared with a composition of the invention, which may be clear or translucent and colorless or nearly colorless.

There is further on provided a method of use of clear or translucent and colorless or nearly colorless emissive coatings on any surfaces for cool elements like cool roofing elements, on elements of aeroplanes, of automobiles, of bicycles, of flying objects, of ships, of trains, of rockets, of satellites, of exterior antennae, of exterior architectural elements, of guard-rail elements, of tanks and of chemical plant elements.

There is further on provided a method of use of an emissive coating on any surface for a cool element or for the protection of an inflammable material or both like on organic or inorganic foils, on papers or wall-papers, on plastics' materials, on fibers' containing materials, on textile materials or on wood containing materials.

There is further on provided a method of use of a clear or translucent and colorless or nearly colorless emissive coating on any surface as clear coating or top coating especially in a paint system, as additional coating on any paint coating, as additional coating on any clear or top coating or as a repair coating, especially for architectural application, for automobile industry, for recreation industry.

There is further on provided a method of use of a clear or translucent and colorless or nearly colorless emissive coating on any surface as a repair coating, especially in that the composition of the emissive coating may be applied by using a tool like a brush, like a sponge, like a tampon, like a stick or like a wipe or like a gel-pack or may be sprayed.

There is finally provided a method of use a clear or translucent or milky and colorless or nearly colorless composition for generating a clear or translucent or milky and colorless or nearly colorless emissive coating on any glass article or any glass window.

DETAILED DESCRIPTION OF THE INVENTION

The object is fulfilled with a composition for applying a clear or translucent and colorless or nearly colorless emissive coating especially for cool roofing preferably on a metallic surface comprising in a dispersion, especially in an aqueous dispersion, a) 50 to 300 g/L of at least one of clear or translucent organic polymeric substances a) of a binder, and b) 30 to 300 g/L of sheet silicate pigments b) having a TE value for the thermal emissivity of at least 0.40, having a particle size distribution of which $d_{50}$ is in the range of 0.3 to 80 μm and having been comminuted, disintegrated, exfoliated or any combination of these to thin particles.

The term "composition" is directed to liquid compositions especially of so-called concentrates, high solids' baths, low solids' baths and replenishment products. Accordingly, the ranges mentioned above are broad to cover all these contents. The term "coating" is typically directed to the dried or dried and cured coating.

The binder may be of any organic polymeric material or of any organic material that is easily rendered to be polymeric or both. The binder and the thereof generated binder matrix of the coating are preferably clear or translucent and colorless or nearly colorless. The organic substances of the binder may be selected from very many well known substances. They are preferably selected from the group consisting of 1.) acrylics like acrylic casting systems, methacrylic systems, self-crosslinking acrylics, crosslinked acrylics, anionic acrylic resin, modified anionic acrylic resin, acryl-modified fluoro polymers, styrene-acrylics like water resistant styrene-acrylics, as well as acrylic-urethanes, 2.) alkyds like silicone modified alkyd resins, 3.) carbonates like polycarbonates, 4.) epoxies like epoxy esters and two component epoxy systems, 5.) fluoropolymers, 6.) ionomers like ethylene acrylates and ethylene methacrylates and like 7.) methylene acrylates, methylene methacrylates, acrylate hydrates and methacrylate hydrates, 8.) phenols, 9.) polyesters like polyester resins, polyester casting systems and polyol two component systems, 10.) polyethers, 11.) polyolefins, 12.) styrenes, 13.) urethanes like urethane-prepolymers, cationic urethane, urethane with a content of a polycarbonate and other urethane copolymers, 14.) vinyls like vinyl esters, 15.) styrene acrylates and 16.) their prepolymers, their derivatives, their modifications, their comonomers, cooligomers and their copolymers including blockcopolymers. More preferred, the composition contains at least one ionomeric compound, at least one acrylic substance, at least one methacrylic substance, at least one urethane substance, any derivative of any of these, any modification of any of these or any combination thereof.

Especially preferred are mixtures or copolymers or both selected from the group consisting of acrylics, carbonates, ionomers, polyesters, polyethers, styrenes and urethanes. The binder forms with the further constituents except of the sheet silicate pigments b), except of optional other particles and except of substances not integrating in the binder matrix or not reacting with the binder like some of the additives. The binder matrix is formed with all other constituents of the composition, especially with amines, others of the additives, crosslinking agents, photoinitiators, silanes or any combination of these. The binder or the binder matrix may be dried and optionally cured—in many embodiments by at least one chemical reaction. The substances added to form the binder may be added as a powder, as a dispersion, as an emulsion, as a solution or in any combination thereof to the composition or may be added to a pre-mixture that will be later added to give the composition or both.

Preferably, the binder or the binder matrix or both are clear or translucent and are colorless or have only a slight color. Preferably, the binder matrix or the dried and optionally cured binder matrix or both are clear or translucent and are colorless or have only a slight color.

Preferably, the sheet silicate pigments are comminuted, disintegrated or exfoliated to thin plate-like particles especially by calcining, milling, exfoliating in a dry status or in a suspension like in water or in a polar solvent or any combination of these. The comminution, disintegration, exfoliation or any combination of these of the sheet silicates used may be or may have been performed by any mechanical or thermal method or both. Preferably, the sheet silicate pigments are or have been thoroughly de-layered or thoroughly splitted or both. More preferred, they are or have been triturated or de-layered or splitted or disintegrated or exfoliated e.g. by calcining or by milling or by any other dressing method or by any similar method or comminuted, disintegrated, exfoliated or by any combination thereof. Preferably, they are strongly comminuted or strongly disintegrated or both.

The sheet silicate pigments have been measured with a Brookhaven Instrument 90Plus Particle Size Analyzer using 90Plus Particle Sizing Software Vers. 3.74. The upper limit of the average particle size $d_{50}$ of the sheet silicate pigments is primarily determined by the thickness of the coating to be generated. Therefore, if the coating would have a thickness e.g. of about 100 µm thickness, an average particle size $d_{50}$ of the sheet silicate pigments of less than 80 µm is preferred. More preferred, the average particle size of the sheet silicate pigments $d_{50}$ is in the range of from 0.4 µm to 60 µm or in the range of from 0.45 to 40 µm or in the range of from 0.5 to 30 µm, even more preferred in the range of from 0.6 to 20 µm or of from 0.8 to 12 µm or of from 1 to 8 µm or of from 1 to 4 µm. Preferably, the sheet silicate pigments have an average particle thickness of less than 10 µm thickness perpendicular to the sheet level, more preferred a particle thickness of less than 8 µm, 6 µm, 4 µm, 3 µm, 2 µm, 1.5 µm or less than 1.0 µm or less than 0.8 µm or less than 0.6 µm or less than 0.4 µm or less than 0.2 µm thickness. Often, the average particle size of the sheet silicate pigments or the average particle thickness perpendicular to the sheet level of the sheet silicate pigments or both depend on the thickness of the coating to be generated and its application. In many embodiments, the sheet silicate pigments do not have any significant coloring tone or even any well visible coloring tone that is clearly seen with the naked eye or that influences the color of the dried or dried and cured binder matrix significantly. Preferably, the sheet silicate pigments are strongly disintegrated or exfoliated or both from bigger well crystallized crystals like big mica crystals. Or they may have been disintegrated or exfoliated or both from any clay or clay-like product like any hydromicas or sericite. In few embodiments, the sheet silicate pigments are fluorescent or are covered with a fluorescent coating, so that they may be well seen e.g. under UV light.

Preferably, the sheet silicate pigments are selected from sheet silicates like micas or clays or both. They may be preferably selected from sheet silicates like pyrophillite, talc, muscovite, phlogopite, lepidolithe, zinnwaldite, margarite, hydromuscovite, hydrophlogopite, sericite, montmorillonite, nontronite, hectorite, saponite, vermiculite, sudoite, pennine, klinochlor, kaolinite, dickite, nakrite, antigorite, halloysite, allophone, palygorskite, synthetic clays like such called Laponite® and such on the base of hectorite, thereto related clays as well as talc. More preferred, they are selected from sheet silicates selected from the group consisting of pyrophillite, muscovite, phlogopite, lepidolithe, zinnwaldite, hydromuscovite, hydrophlogopite, sericite, montmorillonite, vermiculite, kaolinite, dickite, nakrite, antigorite and halloysite. Most preferred, the sheet silicate pigments are selected from the group consisting of pigments based on muscovite, phlogopite, pyrophyllite and zinnwaldite, especially based on muscovite.

The mean particle size of clays like such called Laponite® may preferably be in the range of from 5 to 800 nm, especially in the range of from 10 to 250 nm, 12 to 100 nm, 15 to 60 nm or 20 to 30 nm. The clay particles show preferably an average aspect ratio in the range of from 10 to 8000, of from 50 to 2000 or of from 200 to 800, especially an average aspect ratio of 500±250. It is especially preferred that the clays to be added to the composition are able to hydrate to form gels or sols, which may increase the efficiency of at least one of the thermal properties. When the gel or sol dries, the hydrated particles coalesce to form a film increasing the overall particle size dramatically. Transparent clays are preferred.

The clays and related substances are preferably selected from such on the base of serpentinite/antigorite/chrysotile, on the base of talc/steatite, on the base of hectorite, on the base of stevensite, on the base of talc and/or chlorite, on the base of hydroantigorite or any combination or mixture of these. They may show an optional content of fluorine, further cations and/or sodium pyrophosphate.

The pigments may preferably be added to the composition or to a premixture that will be later added to the composition as a powder or as a dispersion, but their addition as a dispersion is more preferred.

Preferably, there are not added any other particles to the composition. Preferably, there are no other particles, e.g. of pigments, included in the generated coatings of the invention.

Nevertheless, there may be seldom used embodiments, in which an addition of any other particles like coloring pigments, pigments to generate cloudy, dim or dull coatings, infrared=IR reflective pigments not being sheet silicates, thermally conductive pigments, electrically conductive pigments or any combination thereof. The amount of such pigments may then be preferably in the range of from 0.1 to 12 g/L, of from 1 to 8 g/L or of from 3 to 6 g/L. In the generated coating, this pigment content may be in the range of from 0.1 to 12% by weight, of from 1 to 9% by weight or of from 3 to 6% by weight. Then, the liquid composition or the generated coating or both are often not clear or are often not translucent and are often not colorless or are even significantly colored including grey, dark and black colors. Then, of course, it is not possible to generate a clear or translucent and colorless or nearly colorless emissive coating with such modified compositions. Therefore, there is no need to add any organic polymeric substances a) that are clear or translucent and colorless or nearly colorless, but this requirement may be altered then to "milky or translucent or white and in any way colored or white or dark" for the organic polymeric substances a), for any particles resp. pigments added, for the compositions and for the coatings generated thereof.

According to most of the preferred embodiments of the invention, the composition and the thereof generated coating are preferably at least free of chromium $Cr^{6+}$ and are more preferred produced without intentive addition of any chromium compound, which often and preferably means that they are chrome-free. Nevertheless, there may occur seldom situations, in which chromium may be leached out of chromium containing alloys so that traces may be included in the bath of the composition of the present invention or in which traces of chromium are dragged in from other baths into the bath of the composition of the present invention. Then such chromium content can be contained in the generated emissive coating too. Nevertheless, in some of the preferred embodiments of the invention, the composition may preferably contain at least one intentively added chromium compound to enhance the corrosion resistance of the generated coatings, especially of chromium(III), preferably in an amount in the range of from 0.01 to 3 g/L, of from 0.2 to 2 g/L or of from 0.6 to 1.5 g/L $CrO_3$.

Preferably, in many embodiments of the invention, the composition as well as the thereof generated emissive coatings do not contain a significant amount e.g. of up to 0.1 or up to 0.01 g/L in the composition resp. e.g. of up to 0.1 or up to 0.01% by weight in the coating or do not contain any intentively added amount of heavy metals selected from the group consisting of Co, Cr, Cu, Mo, Ni, V, W and Zn.

The content of organic polymeric substances a) in the composition is preferably in the range of from 80 to 260 g/L, of from 100 to 220 g/L, of from 120 to 200 g/L or of from 150 to 180 g/L.

The content of sheet silicate pigments b) in the composition is preferably in the range of from 50 to 260 g/L, of from 80 to 220 g/L, of from 100 to 200 g/L, of from 120 to 180 g/L or of from 140 to 160 g/L.

The weight ratio of organic polymeric substances a) to sheet silicate pigments b) in the composition as well as in the thereof generated coating is preferably in a range of from 10:1 to 1:10, more preferred in a range of from 8:1 to 1:8, of from 6:1 to 1:6, of from 4:1 to 1:4, of from 3:1 to 1:3, of from 2:1 to 1:2, of from 1.5:1 to 1:1.5, of from 1.2:1 to 1:1.2, of from 1.1:1 to 1:1.1 or of about 1:1.

In the generated coating, the content of binder, dried or dried and cured binder may be in the range of from 10 to 90% by weight, of from 20 to 80% by weight, of from 30 to 70% by weight, of from 35 to 65% by weight, of from 40 to 60% by weight or of from 45 to 55% by weight. In the generated coating, the content of binder matrix may be in the range of from 10 to 90% by weight, of from 20 to 80% by weight, of from 30 to 70% by weight, of from 35 to 65% by weight, of from 40 to 60% by weight or of from 45 to 55% by weight.

In the generated coating, the content of sheet silicate pigments may be in the range of from 10 to 90% by weight, of from 20 to 80% by weight, of from 30 to 70% by weight, of from 35 to 65% by weight, of from 40 to 60% by weight or of from 45 to 55% by weight.

The sheet silicate pigments may be treated or may have been treated e.g. chemically or physically or both e.g. with metal, metal oxide, silane or any other substances or not, may perhaps be interference pigments or other coated pigments showing an infrared reflective coating, but more preferred they are untreated which means that they do not have a synthetic coating. Preferably, there are used untreated sheet silicate pigments—which mean that the sheet silicate particles are preferably not coated with a silane, a metal or any other coating material, as it has shown that sheet silicate treated with a metal oxide changes the refractive index and may influence the clearness. Preferably, the sheet silicate pigments do not have any metallized coatings—which mean that these are not metallized sheet silicate pigments, especially, if these coated pigments would create a coloring tint. It has been found that a water content contained in the particles of the sheet silicate pigments is helpful in the emissive behavior of the generated clear or translucent and colorless or nearly colorless emissive coating.

Typically, the sheet silicate pigments emit or reflect or both light especially as visible light or as infrared light or as both. But there may be any sheet silicate pigments that emit or reflect or both light as ultraviolet light or partially in the ultraviolet light. In alternative or in addition thereto, there may be added to the composition and then even contained in the generated emissive coating even any particles or non-particulate substances or both that emit or reflect or both light e.g. as ultraviolet light or partially in the ultraviolet light like invisible fluorescent and like infrared pigments. The content of such particulate or non-particulate substances or both in the composition of the invention may be in the range of from 0.01 to 50 g/L, more preferred of from 0.1 to 30 g/L or of from 0.5 to 12 g/L or of from 1 to 5 g/L. The content of such particulate or non-particulate substances or both in the generated emissive coating may be in the range of from 0.01 to 5% by weight, more preferred of from 0.1 to 3 or of from 0.5 to 1.5% by weight. Such substances may aid to identify such compositions and coatings and may aid to control the homogeneity and quality of the generated coating too.

Preferably, the sheet silicate pigments are selected from the group consisting of mica pigments, coated mica pigments, clay pigments and coated clay pigments. Preferably, these sheet silicate pigments do only have an iron content of less than 5% by weight, of less than 3% by weight, of less than 2% by weight or even of less than 1% by weight. The sheet silicate pigments may be of natural occurrence, of synthetic production, of additional modification or of any combination of these. Then they may have been preferably selected from natural crystallized minerals, from modified natural crystallized minerals or from synthetic crystals or any combination thereof. The sheet silicate pigments may be a composition or a mixture containing one, two, three or even more different types of pigments, e.g. of different grain size distributions, of different average grain sizes, of different average thicknesses, of different pigment minerals, of different mineral chemistries, of different occurrences, of different treatments e.g. of different comminution, disintegration or exfoliation methods, of no or different after-treatment methods like any coating or physical treatment or of any combination thereof. Coated sheet silicate pigments may be of great interest, if they show specific chemical properties or specific physical properties or both in comparison to non-coated sheet silicate pigments.

The sheet silicate pigments may be added as dispersion or as powder or both. The addition as dispersion is preferred. Preferably, it is taken care that the sheet silicate pigments are wetted well with the binder during mixing, e.g. by adding at least one surfactant, by reducing the concentration of the dispersion or by selecting adequate organic polymeric substances that wet easier or by any combination of these.

Preferably, the sheet silicate pigments used for the comminution, disintegration, exfoliation or any combination of these of sheet silicate crystals are free from impurities like other minerals, free from inclusions of iron oxides and/or hydroxides and manganese oxides and/or hydroxides and free from inclusions of other small crystals.

It has been found that the emissive coatings of the invention e.g. having a content of ethylene acrylic copolymer are astonishing clear so that the underlying substrate and e.g. its metallic structure can be excellently seen, if the binder or the binder matrix or both in which the sheet silicate pigments are imbedded, show a refractive index of the same value or of a value nearby those of the sheet silicate pigments.

According to a more preferred embodiment of the invention, a binder matrix is formed primarily from the organic polymeric substances a), in which the sheet silicate pigments b) and optionally other particles are imbedded, wherein a coating is formed after applying and drying of the composition and optionally by curing the coating and wherein the binder matrix of the dried or dried and cured coating shows a refractive index n in the range of from 1.45 to 1.70 to be exactly or nearly adapted to the refractive index of the sheet silicate pigments embedded in the binder matrix. It has been found that a binder matrix which has been generated primarily from ionomeric compounds may show a refractive index of about 1.50 to 1.52, which fits excellent to the refractive index of muscovite or similar sheet silicate pigments that often show a mean refractive index of about 1.49 to 1.52.

Often, the refractive index of sheet silicates like e.g. of muscovite mica are in a range of from 1.55 to 1.65. Often, the refractive index of organic polymeric substances is in the range of from 1.30 to 1.65. The refractive index of acrylics may be preferably in the range of from 1.45 to 1.55, especially of from 1.48 to 1.51. The refractive index of urethanes may be preferably in the range of from 1.45 to 1.65, especially of from 1.48 to 1.61. The refractive index of ionomers may be preferably in the range of from 1.42 to 1.58, especially of from 1.48 to 1.54.

Most of these sheet silicate pigments, especially those that are colorless or show only light colors, have a refractive index in the range of from 1.46 and 1.66, preferably in the range of from 1.48 and 1.62 or in the range of from 1.50 and 1.60.

Preferably, the average refractive index $n_M$ of the binder matrix deviates from the average refractive index $n_P$ of the sheet silicate pigments embedded in the binder matrix—a) in the liquid composition or b) in the coating after applying and drying of the composition or in both cases—with a value of up to +0.10 or up to +0.05 or up to +0.0.03 or up to +0.01 or up to −0.01 or up to −0.03 or up to −0.05 or up to −0.00.

Preferably, the refractive index $n_P$ of the sheet silicate crystals of the pigments used has only a slight or no deviation depending on the different crystallographic directions a to c of the crystals ($\Delta n_1 = n_a - n_b$ or $n_a - n_c$ which difference is bigger) or only a slight or no deviation dependent on the wavelength of the visual light passing the crystals ($\Delta n_2 = n_{violet} - n_{red}$ "dispersion") or both. Preferably, $\Delta n_1$ or $\Delta n_2$ or both are not greater than 0.20 or are not greater than 0.10 or are not greater than 0.05. The smaller these values are, the easier it is to generate excellent clear coatings.

The sheet silicate pigments seem to be mostly or always emissive and seem to be mostly reflective as is meant for the measurement of TE and TSR. Preferably, there is an addition of any clay, if it has a positive effect on the data of TE, TSR, SRI or any combination thereof. Clays have shown to optimize the thermal properties as well as the rheological properties. Clays may aid as dispersing agents and perhaps even as film-forming agents. The weight ratio of sheet silicate pigments b) to organic polymeric substances a) is preferably in the range of from 40 to 105% by weight of the content of organic polymeric substances a), more preferred in the range of from 50 to 100 or from 60 to 90 or from 70 to 80% by weight.

More preferred, the organic polymeric substances a) are adapted to have the same or nearly the same refractive index like at least some of the sheet silicate pigments or like the average refractive index of the sheet silicate pigments or both. This may mean, that organic polymeric substances a) are preferably selected that show a refractive index n in a range of from 1.45 to 1.70.

The binder may contain of at least one of organic polymeric substance in a dispersion, emulsion, solution or any combination thereof selected from the group consisting of organic oligomers, organic prepolymers, organic polymers, organic copolymers and any combination thereof, seldom with a content of organic monomers in some embodiments. The binder may contain at least one of organic substances on the base of substances selected from the group consisting of acrylics, alkyds, carbonates, elastomers, epoxies, two component epoxy systems, fluoropolymers, ionomers like ethylene acrylate, ethylene methacrylate, methylene acrylate, methylene methacrylate, acrylate hydrate and methacrylate hydrate, polyesters, polyethers, polyolefins, styrenes, urethanes, vinyls as well as their derivates like esters, their mixtures and their comonomers, cooligomers, copolymers and blockcopolymers of these like urethane-acrylics like vinyl esters, epoxy esters and derivatives of any ionomers. The binder may be further on a polyol two component system, a polyester casting system, a silicone modified alkyd resin system or any system on the base of substances as just mentioned above. The binder may preferably contain at least one of organic substances of acrylic-urethanes, self-crosslinking acrylics, crosslinked acrylics, water resistant styrene-acrylics, acryl-modified fluoropolymers, epoxy esters, polyol two component systems, vinyl esters, two component epoxy systems, acrylic casting systems, polyester casting systems, silicone modified alkyd resins, urethane acrylics and urethane-prepolymers. It preferably contains at least one clear or translucent organic polymeric substance, especially at least one clear or translucent organic polymeric substance as just mentioned here in this paragraph above.

Preferably, there are added further constituents as helpful or necessary constituents for a binder or binder matrix to generate an excellent organic composition and an excellent organic coating: Preferably as matrix for the sheet silicate pigments, especially a combination is used of at least one organic substance to be polymerized or which is already polymerized and of at least one substance selected from the group consisting of amines, anti-blocking agents, catalysts, coalescent agents, crosslinking agents, photoinitiators, slip aids and wetting agents.

1.) For example, in a first group of binders or binder matrices, for the generation of coalescing dried coatings, there may be used e.g. at least one organic substance especially as oligomers, prepolymers, polymers, copolymers or any combination of these like at least one ionomer like ethylene acrylate and/or ethylene methacrylate, and/or like at least one of methylene acrylates, methylene methacrylates, acrylate hydrates and methacrylate hydrates, like styrene acrylate or like at least one of acrylics, polyesters, polyethers, and urethanes or any combination thereof.

The content of ionomerics in the organic polymeric substances a) or in the binder or in the binder matrix is preferably in the range of from 5 to 100% by weight, more preferred in the range of from 5 to 100% by weight, of from 10 to 95% by weight, of from 15 to 90% by weight, of from 20 to 85% by weight, of from 25 to 80% by weight, of from 30 to 75% by weight, of from 35 to 70% by weight, of from 40 to 65% by weight, of from 45 to 60% by weight or of from 50 to 55% by weight.

The content of all organic polymeric substances a) in the composition is preferably in the range of from 20 to 300 g/L, of from 40 to 280 g/L of from 60 to 260 g/L, of from 80 to 240 g/L, of from 100 to 220 g/L, of from 120 to 200 g/L, of from 140 to 180 g/L or of from 150 to 165 g/L.

The content of ionomerics in the composition is preferably in the range of from 20 to 300 g/L, of from 40 to 280 g/L of from 60 to 260 g/L, of from 80 to 240 g/L, of from 100 to 220 g/L, of from 120 to 200 g/L, of from 140 to 180 g/L or of from 150 to 165 g/L.

The content of ionomerics in the dried or dried and cured binder matrix, especially of the emissive coating, is preferably in the range of from 2 to 95% by weight, more preferred in the range of from 5 to 90% by weight, of from 10 to 85% by weight, of from 15 to 80% by weight, of from 20 to 75% by weight, of from 25 to 70% by weight, of from 30 to 65% by weight, of from 35 to 60% by weight, of from 40 to 55% by weight or of from 45 to 50% by weight.

The content of ionomerics in the coating is preferably in the range of from 2 to 80% by weight, more preferred in the range of from 5 to 75% by weight, of from 10 to 70% by weight, of from 20 to 65% by weight, of from 25 to 60% by weight, of from 30 to 55% by weight, of from 35 to 50% by weight or of from 40 to 45% by weight.

Preferably, the composition or the thereof generated coating or both contain a mixture of ionomerics and acrylics like hydroxylated acrylic or self-crosslinking acrylic or both especially as at least one emulsion or a mixture of ionomerics and urethane-acrylics like self-crosslinking polyurethane acrylic acid copolymer especially as at least one dispersion or a mixture of ionomerics and urethanes especially as at least one dispersion or any combination thereof. The total contents of the acrylics or of the urethane-acrylics or of the urethanes or of any combination thereof in the composition or in the thereof generated coating or both are preferably in the range of from 1 to 80% by weight, more preferred in the range of from 5 to 75% by weight, of from 10 to 70% by weight, of from 20 to 65% by weight, of from 25 to 60% by weight, of from 30 to 55% by weight, of from 35 to 50% by weight or of from 40 to 45% by weight. Preferably, the weight ratio of ionomerics to acrylics or to urethane-acrylics or to urethanes or to any combination thereof in the composition or in the thereof generated coating or both are preferably in the range of from 8:1 to 1:8, of from 6:1 to 1:6, of from 4:1 to 1:4, of from 3:1 to 1:3, of from 2:1 to 1:2 or of from 1.5:1 to 1:1.5.

Then it is preferred to add at least one coalescent agent to assist in the homogenization of the organic substances especially during drying of the coating. These coalescent agents may be preferably selected from long-chain alcohols having 4 to 24 C atoms. The so-called long-chain alcohols are particularly advantageous for aiding in film-formation They have preferably 4 to 20 C atoms or 5 to 18 C atoms or 6 to 16 C atoms, particularly preferably 8 to 12 C atoms. Preferable examples of these are: butylene glycols, butylene glycol ethers, ethylene glycols, ethylene glycol ethers such as ethylene glycol monobutyl ether, ethylene glycol monoethyl ether, ethylene glycol monomethyl ether, ethyl glycol propyl ether, ethylene glycol hexyl ether, diethylene glycol methyl ether, diethylene glycol ethyl ether, diethylene glycol butyl ether and diethylene glycol hexyl ether, propylene glycols, propylene glycol ethers such as propylene glycol monomethyl ether, dipropylene glycol monomethyl ether, tripropylene glycol monomethyl ether, propylene glycol monobutyl ether, dipropylene glycol monobutyl ether, tripropylene glycol monobutyl ether, propylene glycol monopropyl ether, dipropylene glycol monopropyl ether, tripropylene glycol monopropyl ether and propylene glycol phenyl ether. The total content of coalescent agents in the composition is preferably in a range of from 0.01 to 50 g/L, of from 0.1 to 40 g/L, of from 0.5 to 30 g/L, of from 1 to 20 g/L, of from 2 to 12 g/L or of from 4 to 8 g/L. In some embodiments, the addition of two or three different coalescent agents having different glass transformation temperatures $T_g$ is preferred.

The coalescent agents may assist in film formation, preferably by lowering the drying temperature or the glass transformation temperature $T_g$ or both, in many cases even without use of any crosslinking agent and without use of any photoinitiator. Further on, the addition of at least one crosslinking agent especially on the base of a zirconium compound is especially preferred. The content of at least one zirconium compound in the composition is preferably in the range of from of from 2 to 150 g/L, of from 5 to 120 g/L, of from 10 to 100 g/L, of from 20 to 80 g/L, of from 30 to 60 g/L or of from 40 to 50 g/L. The drying and coalescing may preferably occur at a temperature in the range of from 20° C. to 150° C., more preferred in the range of from 30° C. to 120° C., especially if coalescent agents are used without any crosslinking agent. The drying and coalescing may preferably occur at a temperature in the range of from 50° C. to 350° C., more preferred in the range of from 80° C. to 250° C. or of from 90° C. to 180° C. The drying and coalescing may preferably be used if at least one coalescent agent is used a) together with any crosslinking agent like a zinc compound, a zirconium compound, a compound on the base of melamine, isocyanate, isocyanurate, silane or any combination thereof. Or the drying and coalescing may preferably be used if at least one coalescent agent is used b) together with any oxidative drying agent for crosslinking an alkyd resin containing double bonds or c) together with any autooxidation process catalyzed by at least one transition metal salt or d) together with any drier such as cobalt naphthenate or any combination of a) to d) thereof.

In some embodiments it is preferred that the temperatures do not to exceed 60° C. not to cause crosslinking with a chelate if this is present—because of the stability of the dispersion.

Of course, there may be added at least one amine c) or any other additive d) or both.

Such compositions have shown to be easy to be produced, to form a good binder matrix, to be stable, well applicable and not too expensive. The thereof generated coatings have shown to be highly corrosion resistant, adhere well to the substrate surface and are excellent as carrier for sheet silicate pigments to create excellent emissive coatings that are mostly clear or at least translucent and that are often colorless or at least nearly colorless. They show excellent data for TE, TSR and SRI.

2.) For example, in a second group of binders or binder matrices, for the generation of dried and chemically cured coatings e.g. by thermal influence, there may be used e.g. at least one organic material especially as oligomers, prepolymers, polymers, copolymers or any combination of these like at least one ionomeric like ethylene acrylate, like any styrene acrylate, like at least one other acrylic, like at least one methacrylate etc.

Then it is preferred to add at least one crosslinking agent to assist in the chemical curing of the organic substances especially during drying or heating or both of the coating. These crosslinking agents may preferably be selected from the group consisting of isocyanates, isocyanurates, melamines, zinc compounds and zirconium compounds, more preferred a zirconium ammonium carbonate, a zinc oxide or both. Or there may be used any organic polymeric substances having any such groups instead or additionally to these crosslinking agents. Of course, there may be added at least one other additive d).

3.) For example, in a third group of binders or binder matrices, for the generation of dried and radically cured coatings by e.g. by UV radiation or any short wave energy-rich radiation, there may be used e.g. at least one organic material especially as oligomers, prepolymers, polymers, copolymers or any combination of these containing at least one acrylic, at least one epoxy, at least one ionomeric like ethylene acrylate, at least one polyester, at least one polyether, at least one urethane like acrylate-urethane or any combination of these.

Then it is preferred to add at least one photoinitiator to assist in the curing of the organic substances especially during UV cure and perhaps even on an additional thermal precure or postcure of the coating. These photoinitiators may be selected from any photoinitiators well-known in the art. Of course, there may be added at least one other additive d).

The dispersion, emulsion, solution or any combination thereof may contain essential contents of water or of at least one organic solvent or of at least one reactive diluent or any combination thereof. More preferred, a binder or binder matrix 1.) especially for drying and coalescing contains as solvents only water and coalescent agent(s). More preferred, a binder or binder matrix 2.) especially for chemically curing contains as solvents only water and optionally coalescent agent(s) and organic solvent(s). More preferred, a binder or binder matrix 3.) contains as solvents only water or even only traces of water and optionally only traces of other organic solvent(s).

In general, the composition of the present invention may preferably be an alkaline system containing additionally c) 0.05 to 30 g/L of at least one amine. The amines may in some cases be important for improving the stability of the resins and may be often important for the behavior in the presence of surfactants, especially of anionic surfactants. Especially preferred is an addition of at least one volatile amine that is able to air-dry like N,N-dimethylisopropylamine or 2[(1-methylpropyl)amino]ethanol or both. The content of at least one amine c) in the composition is preferably of from 0.2 to 25 g/L, of from 0.5 to 20 g/L, of from 1 to 15 g/L, of from 1.5 to 10 g/L, of from 2 to 8 g/L or of from 4 to 6 g/L. The weight ratio of amines c) to organic polymeric substances a) is preferably in the range of from 0.01 to 5% by weight of the content of organic polymeric substances a), more preferred in the range of from 0.2 to 4 or 1 to 3% by weight. It has shown to be significantly advantageous if these ranges of contents are maintained to stabilize the viscosity and odour generation. The amount of amine depends preferably on the resin system. It is preferred that an ionomeric system does not have more than 1.4% by weight of at least one amine. Most of the organic polymeric substances have a content of at least one amine in the range of from 0.2 to 1.0% by weight. But the composition of the present invention may in alternative thereto preferably be an acidic system containing additionally at least one acidic constituent like a fluoro acid or a phosphorus containing acid or both.

Preferably, the composition contains additionally d) 0.05 to 150 g/L of at least one of the additives selected from the group consisting of at least one of coalescent agents, co-solvents, crosslinking agents, defoamers, dispersing agents, photoinitiators, plastizisers, slip agents, surfactants, thixotropes, UV absorbing substances, waxes and wetting agents.

The coalescent agent acts as a film-forming agent and the co-solvent acts as a volatile film-forming agent, wherein the film-forming agent is used to lower the glass transformation temperature $T_g$ at a certain temperature range to be able to coalescence the organic polymeric particles to a closed film, especially during drying. The plastiziser has an effect to soften the drying and the dry coating. Further on, the corrosion resistance of metallic substrates may be further improved in comparison to coatings without any pretreatment layer and/or any paint layer below, if an emissive coating according to the invention is generated. The high corrosion resistance is significantly positively influenced by the addition of a significant content of sheet silicate pigments too.

The surfactant may assist to stabilize the dispersion, emulsion or any combination thereof. The wetting agent improves the wetting behavior on the substrate. The content of all additives d) in the composition is preferably of from 0.2 to 125 g/L, of from 0.5 to 100 g/L, of from 1 to 75 g/L, of from 2 to 60 g/L, of from 4 to 50 g/L, of from 7 to 40 g/L, of from 10 to 30 g/L or of from 15 to 20 g/L. An added singular additive d) may be preferably contained in the composition of from 0.01 to 50 g/L, of from 0.1 to 40 g/L, of from 0.5 to 30 g/L, of from 1 to 20 g/L, of from 2 to 12 g/L or of from 4 to 8 g/L. The weight ratio of additives d) to organic polymeric substances a) is preferably in the range of from 0.1 to 50% by weight of the content of organic polymeric substances a), more preferred in the range of from 2 to 40 or 8 to 30 or 12 to 20% by weight. It has shown to be significantly advantageous if the ranges of content of all kinds of additives d) together show 15% by weight or less of the content of organic polymeric substances a) or if it is more preferred in a range of 0.5 to 5% by weight. Preferably, the content of at least one chelate or of at least one crosslinking agent or both are 15% by weight or less of the content of organic polymeric substances a).

As the UV absorbing substances, many substances may be added. Preferably, a triazole base substance is added to the composition. Most preferred, hydroxyphenyl-benzotriazole is added as UV absorbing substance, as it does not or not substantially influence or affect the thermal properties of the composition and of the thereof generated coating.

Preferably, the composition contains additionally e) 1 to 200 g/L of at least one of crosslinking agents and photoinitiators, especially a crosslinking agent selected from the group consisting of at least one of isocyanates, isocyanurates, melamines, zinc compounds and zirconium compounds, more preferred a zirconium ammonium carbonate, a zinc oxide or both. The content of all crosslinking agents and photoinitiators e) in the composition is preferably of from 2 to 150 g/L, of from 5 to 120 g/L, of from 10 to 100 g/L, of from 20 to 80 g/L, of from 30 to 60 g/L or of from 40 to 50 g/L. The weight ratio of crosslinking agents e) to organic polymeric substances a) is preferably in the range of from 1 to 20% by weight of the content of organic polymeric substances a), more preferred in the range of from 4 to 18 or 7 to 12% by weight. As zirconium ammonium carbonate may additionally show the function of a chelating agent, it is in this application only calculated as a crosslinking agent. It has shown to be significantly advantageous if the ranges of content show 9% by weight of substances e) or less, as otherwise it might affect the stability of the dispersion.

Preferably, the composition contains additionally f) 0.5 to 50 g/L of at least one of chelating agents and chelates, especially selected from the group consisting of at least one of tartrates, tartaric acid and a water-soluble or water-dispersible organic titanium chelate compound. The content of all chelating agents and chelates f) in the composition and in the coating—calculated as added contents and not as reacted compounds in the generated coating—is preferably of from 1 to 45 g/L, of from 3 to 40 g/L, of from 5 to 35 g/L, of from 8 to 30 g/L, of from 12 to 25 g/L or of from 16 to 20 g/L. The weight ratio of chelating agents and chelates f) to silanes g) is preferably in the range of from 10 to 50% by weight of the content of organic polymeric substances a), more preferred in the range of from 15 to 40 or 20 to 32% by weight. It has shown to be significantly advantageous if the addition of substances f) is 25% by weight of the content of organic polymeric substances a) or less, as the stability of the dispersion may be affected.

Preferably, the composition contains additionally g) 1 to 100 g/L of at least one silane, especially at least one silane, especially selected from the group consisting of alkoxysilanes, epoxysilanes, at least one nitrogen containing group containing silanes and oligomeric silanes, calculated as corresponding silanes added and not calculated as silanols, not calculated as siloxanes, not calculated as polysiloxanes and not calculated as further on modified compounds. The silanes added may be non-hydrolyzed—especially contained in an alcoholic solution—or partially or totally hydrolyzed and then especially contained in an aqueous solution. The condensation or polymerization of the silanes or silanols may have already started to siloxanes. The silanes added may have been already partially crosslinked or polymerized so that they are oligomers. The silanes may have been modified e.g. so that they show several groups per molecule binding to the substrate surface or e.g. so that they have a certain oligomeric structure or both. There may have been added before any further compound to the silane containing solution like acetic acid or there may have been any chemical reaction before generating or adding e.g. an alcohol or any acid. They may have been chemically modified, e.g. functionalized or brought into an oligomeric or even polymeric condition. The at least one nitrogen containing group containing silanes may show at least one of amido groups, amino groups, imido groups, imino groups, urea groups or any combination thereof. They may be selected from any kind of amidosilanes, aminosilanes, imidosilanes, iminosilanes, or ureasilanes or any combination thereof. The at least one nitrogen containing group containing silanes and especially the aminosilanes may show one, two, three or even more nitrogen containing groups per molecule like amino groups.

The content of all silanes g) in the composition is preferably of from 2 to 85 g/L, of from 4 to 70 g/L, of from 6 to 60 g/L, of from 8 to 50 g/L, of from 10 to 40 g/L, of from 12 to 35 g/L, of from 16 to 30 g/L or of from 20 to 25 g/L. The weight ratio of silanes g) to organic polymeric substances a) is preferably in the range of from 1 to 30% by weight of the content of organic polymeric substances a), more preferred in the range of from 3 to 25, of from 5 to 21, of from 7 to 18 or 10 to 14% by weight. It has shown to be significantly advantageous if the addition of silanes g) is 12% by weight of the content of organic polymeric substances a) or less, as this might affect the water sensitivity of the coating.

In the generated coating, the content of silane, siloxane and polysiloxane, which is not reacted with other compounds of the composition, may be in the range of from 0.05 to 20% by weight, of from 0.2 to 18% by weight, of from 0.5 to 15% by weight, of from 1 to 12% by weight, of from 3 to 10% by weight or of from 5 to 8% by weight. But in many embodiments, an addition of 2 to 4% by weight is most preferred.

Finally, there may be a content of at least one organic solvent, especially of at least one of alcohols, especially of alcohols having 1 to 4 carbon atoms with 1 hydroxy group each or of glycol ethers or of ketones or of both, or any mixture therewith, preferably in an amount in the range of from 0.01 to 500 g/L. The content of all organic solvents except of coalescent agents in the composition is preferably of from 0.2 to 400 g/L, of from 1 to 300 g/L, of from 5 to 200 g/L, of from 10 to 150 g/L, of from 20 to 120 g/L, of from 30 to 100 g/L, of from 40 to 80 g/L or of from 50 to 65 g/L. Such organic solvent or solvent mixture may additionally contain a low or high content of water or no water. Many compositions according to the invention are free or nearly free of such organic solvents. Then these compositions may contain in alternative water or any reactive diluents or both. Then, the chemical system may be a pure aqueous system or an aqueous system with a minor amount of organic solvent. In many instances, an aqueous system or even an aqueous system free of organic solvent is most preferred. The content of water in the composition is preferably of from 0.01 to 500 g/L, of from 0.2 to 400 g/L, of from 1 to 300 g/L, of from 5 to 200 g/L, of from 10 to 150 g/L, of from 20 to 120 g/L, of from 30 to 100 g/L, of from 40 to 80 g/L or of from 50 to 65 g/L.

Preferably, the composition has a zeta potential in the range of from −30 to −70 mV or more preferred of from −40 to −50 mV. It has been found that a zeta potential of this range as measured with a Brookhaven Instrument BIC 90Plus Particle Size Analyzer in combination with a BI-Zeta Instrument used together with 90Plus Bi-Zeta Software indicates that the liquid composition is in a stable condition. The zeta potential is only measured in an aqueous system. The zeta potential may preferably be adapted to be in the range of from −30 to −70 mV, especially by changing the concentration of the dispersion e.g. by water addition. The stability of the dispersion may be controlled by controlling the zeta potential of the dispersion. If the zeta potential of the dispersion should be greater than −70 mV, there should not be a problem, but if the zeta potential would be less of −35 mV (like for −20 mV), there may occur a problem with the stability of the dispersion.

According to the present invention, the process for applying a clear or translucent and colorless or nearly colorless emissive coating on the surface of a substrate to be thermally protected like the surface of a cool element, like a metallic surface of a cool element e.g. of a cool roof element, which may be especially used for cool roofing, is based on the composition of the present invention and is applied on a surface of a cool element or of an inflammable element or of both which may be the substrate to be coated like any metallic surface, any glass surface, any paper surface, any wood containing surface, any surface of plastics' material, any surface of organic or inorganic foil, on a surface of any paper or wall-paper, on a surface of plastics' materials', on a surface of fibers' containing materials, on any textile surface or any coated surface like any painted surface, wherein the coating is dried and wherein the dried coating or the dried and additionally cured coating.

In the process of the invention, there are nearly all industrial application methods for the application of the composition onto the substrate surface possible. It is preferred that the composition is applied onto the substrate surface by brushing, dipping, direct roll-coating, reverse roll-coating, spraying or any combination thereof. Most often, coil coating is used e.g. with reverse roll-coating. In the production of corrugated sheets made of Galvalume®, it has shown to be significantly advantageous if processed by reverse roll-coating.

Preferably, the liquid film applied on a substrate surface has a film thickness in the range of from 0.01 to 2000 μm, preferably the liquid film has a thickness in the range of from 0.05 to 1500 μm, of from 0.1 to 1200 μm, of from 0.3 to 1000 μm, of from 0.6 to 800 μm, of from 1 to 600 μm, of from 2 to 500 μm, of from 3 to 400 μm, of from 5 to 300 μm, of from 8 to 250 μm, of from 12 to 200 μm, of from 18 to 180 μm, of from 24 to 160 μm, of from 30 to 140 μm, of from 40 to 120 μm, of from 50 to 100 μm, of from 60 to 90 μm or from 70 to 80 μm. In many embodiments, the coating thickness will be in the range of from 15 to 55 μm.

The coating weight and the coating thickness of a type of emissive coating depends significantly from the application and the substrate used. Preferably, the generated dried or dried and cured coating according to the invention has a coating weight in the range of from 0.01 to 2000 g/m², preferably a coating weight in the range of from 0.05 to 1500 g/m², of from 0.1 to 1200 g/m², of from 0.3 to 1000 g/m², of from 0.6 to 800 g/m², of from 1 to 600 g/m², of from 2 to 500 g/m², of from 3 to 400 g/m², of from 5 to 300 g/m², of from 8 to 250 g/m², of from 12 to 200 g/m², of from 18 to 180 g/m², of from 24 to 160 g/m², of from 30 to 140 g/m², of from 40 to 120 g/m², of from 50 to 100 g/m², of from 60 to 90 g/m² or from 70 to 80 g/m². In many embodiments, the coating thickness will be in the range of from 10 to 85 g/m², especially on metallic surfaces often in the range of from 10 to 28 g/m².

Preferably, the generated dried or dried and cured coating according to the invention has a coating thickness in the range of from 0.005 to 1000 μm, preferably a coating weight in the range of from 0.025 to 750 μm, of from 0.05 to 600 μm, of from 0.1 to 500 μm, of from 0.3 to 400 μm, of from 0.5 to 300 μm, of from 1 to 250 μm, of from 1.5 to 200 μm, of from 2.5 to 150 μm, of from 4 to 125 μm, of from 6 to 100 μm, of from 9 to 90 μm, of from 12 to 80 μm, of from 15 to 70 μm, of from 20 to 60 μm, of from 25 to 50 μm, of from 30 to 45 μm or from 35 to 40 μm.

In the process of the invention, the peak-metal-temperature of the just coated substrate surface may have quite different temperatures. For some embodiments like in coil coating, it is preferably in the range of from 70 to 170° C. or from 90 to 140° C. This temperature, as it is often used for coil-coating, has the advantage that the composition applied can dry within few seconds so that there is no need for any further heating or any longer distance of the coil coating line until the next coating station. For heat-sensitive substrates or substrate materials or both, it is specifically preferred to apply a composition of the first group of binders or binder matrices 1.) which needs only a drying at a limited drying temperature or to apply a composition of the first group of binders or binder matrices 1.) which needs only a drying at a limited drying temperature preferably in a range of from 15 to 80° C. or of from 20 to 50° C. and preferably only a short drying e.g. of less than 5 minutes. In alternative thereto, there may be applied on heat-sensitive substrates or substrate materials or both a composition of the first group of binders or binder matrices 3.) which needs only a drying at a limited drying temperature in a range of from 15 to 50° C. and a curing with energy-rich radiation like UV radiation in such way that even thereby there is only a limited heating up combined with such irradiation.

In the process of the invention, the composition is preferably applied on surfaces of aluminum, aluminum alloy, chrome, copper, copper alloy, Galvalume®, Galfan®, Galvanneal®, magnesium alloy, iron, steel, tinplate, titanium alloy, zinc, zinc alloy or any combination thereof. Especially, it is applied on bright metallic surfaces.

But in the case that any paint layer shall be thermally protected, there is no need that its substrate is a metallic substrate. In alternative thereto, the substrate may be a coated substrate like a painted substrate, an organically covered substrate, an organic substrate like a plastics' material, an organic or inorganic foil, a paper or wall-paper, a wooden or wood containing material, a glass substrate or a clear or translucent plastics' material, a fibers' containing material, a textile material, any combination of metallic and non-metallic materials or any combination of metallic or other inorganic materials, glass, plastics' material, wooden or any other organic material, painted substrate and organically covered substrate.

In the process of the treatment of metallic surfaces, there may be first an acidic or alkaline cleaning, an etching, a pickling, any rinsing e.g. with water, any heating or any combination thereof, prior to the application of the emissive coating or prior to a pretreatment which is prior to the application of the emissive coating.

In the process of the invention, the composition may be preferably applied onto any substrate of any material, preferably onto a pretreated metallic surface. Thereby, the corrosion resistance and the adhesion of the emissive coating on a substrate surface or on an already pretreated or precoated substrate surface may be further improved in comparison to coatings without any pretreatment coating below.

In one variety of the process of the invention, the composition is preferably applied onto a painted substrate surface or onto a paint layer which is located on any kind of substrate. Thereby, the emissivity and further thermal properties are improved. In another very favorable embodiment, the emissive coating of the present application may be modified in such way that it has a micro-roughened surface to gain a lotus effect by the topology of the micro-rough surface or that at least one hydrophobic substance is added to the composition to generate a lotus effect by the hydrophobic surface of the coating or by both. The micro-roughening may be generated by varying the concentration or viscosity or both during the application of a composition with a high content of sheet silicate pigments, which preferably show at least two peaks of very different particle sizes. The hydrophobicity of the generated coating may be gained by adding at least one hydrophobic organic polymeric substance a) like a fluoropolymer or a polyolefin, e.g. even in the form of fine particles, or by adding a considerably high proportion of at least one silane generating a sufficient hydrophobicity or by adding a content of at least one fluorosilane or both.

Further on, the corrosion resistance of metallic substrates may be further improved in comparison to coatings without any pretreatment layer and/or any paint layer below, if an emissive coating according to the invention is generated. The high corrosion resistance is significantly positively influenced by the addition of a significant content of sheet silicate pigments and the quality of the sheet silicate pigments too. The quality of the sheet silicate pigments, especially of the mica pigments, may be measured by electrical conductivity: The higher the electrical resistance, the better seems the quality of the sheet silicate pigments to be.

In the process of the invention, there may be a skin pass composition preferably additionally applied prior to the application of the composition for clear or translucent and colorless or nearly colorless emissive coating. Such a skin pass composition respectively the thereof generated thin coating has the advantage that it often enhances the corrosion resistance of the metallic substrate significantly. The skin pass coating may help as a mobility enhancer e.g. in a coil coating line, which assists in the unproblematic transportation of coil especially with high speed in the coil coating line. Further on, a skin pass composition or another kind of pretreatment composition may be applied first on an existing paint layer, so that it may be afterwards coated with the emissive coating according to the invention.

Preferably, the skin pass composition is a pretreatment composition. The skin pass composition may be applied to gain a higher corrosion resistance, a better adhesion of the emissive coating onto the substrate surface, to flatten and smoothen the substrate surface and to prevent galling of the substrate surface especially during the leveling process of the coil coating line used. A skin pass composition like Gardolube® L 8250 may be more preferred applied. This product is a mixture containing different amines, different alcohols and further organic solvent, which mixture may even have a chelating effect. Therefore, a skin pass composition may preferably contain at least one amine, at least one alcohol and at least one organic solvent. But alternatively, other types of pretreatment may be used in alternative or additionally like an alkali metal phosphating, a zinc phosphating, a silane coating etc., but some of these may optically cover the structure of the substrate surface. These pretreatments aid e.g. in corrosion resistance and paint adhesion.

According to the present invention, a clear or translucent and colorless or nearly colorless emissive coating may be prepared with a composition of the invention.

In the generated emissive coating according to the invention, there are preferably 45 to 95% by weight of organic polymer(s) a) and 5 to 55% by weight of sheet silica pigment(s) b). The weight ratio of sheet silicate pigments b) to organic polymeric substances a) in the emissive coating is preferably in the range of from 30 to 115 or from 40 to 105% by weight of the content of organic polymeric substances a), more preferred in the range of from 50 to 100 or 60 to 90 or 70 to 80% by weight. The emissive coating according to the invention may have a content of binder a) and pigment b) in a pigment-to-binder weight ratio in the range of from 0.3:1 to 1.2:1, of from 0.5:1 to 1.1:1 or of from 0.7:1 to 1.0:1.

Further on, the generated emissive coating according to the invention may contain at least one amine or reacted amine or both c) or any reaction product thereof or any combination of these in a total content of from 0.05 to 8%, especially of from 0.5 to 5% by weight. The amount of amine depends significantly from the resin system used.

Further on, the generated emissive coating according to the invention may contain at least one additive d) in a total content of from 0.05 to 15% by weight, of from 0.3 to 12% by weight, of from 0.8 to 10% by weight, of from 1.2 to 8% by weight or of from 2.5 to 6% by weight.

Further on, the generated emissive coating according to the invention may contain at least one crosslinking agent or reacted agent or both e) in a total content of from 0.1 to 40%, especially of from 1 to 20% or of from 4 to 12% by weight.

Further on, the generated emissive coating according to the invention may contain at least one chelating agent or chelate or both f) in a total content of from 0.1 to 5% by weight, of from 0.8 to 4% by weight or of from 1.5 to 3% by weight.

Further on, the generated emissive coating according to the invention may contain at least one silane or silyl groups bound by reaction or both g) in a total content of from 0.1 to 30%, especially of from 1 to 20%, of from 3 to 15% by weight or of from 6 to 11% by weight.

Finally, the generated emissive coating according to the invention may additionally contain at least one UV light adsorbing substance so that there is a certain protection of the emissive coating against degradation by UV light.

The microscopic structure of the emissive coating according to the invention typically shows under a scanning electron microscope a uniform distribution of sheet silicate pigments within the binder matrix. Preferably, the generated coatings do only show these two phases.

Certain organic polymers such as polyesters are known to be sensitive to solar-induced heat build-up and may loose gloss and may change color, color intensity as well as other chemical and physical properties. Therefore, it is expected that the emissive coatings of the present invention will have the advantage to conserve much longer than similar conventional coatings their original properties, as they do not heat up as much if they are used in areas with high solar irradiance.

According to the present invention, a cool element like a cool roofing element that comprises a substrate having an upper surface as well as a clear or translucent and colorless or nearly colorless emissive coating on at least a portion of the upper surface of the substrate, wherein the coating is a dried film of the composition of the invention, wherein the emissive coating has 1.) a thermal emissivity TE in accordance with ASTM C-1371-04a preferably of at least 0.40, of at least 0.50 or of at least 0.55 and preferably of up to 0.95 or up to 0.90 or up to 0.80, 2.) a total solar reflectance TSR in accordance with ASTM C-1549-04 preferably of at least 0.40, of at least 0.50 or of at least 0.55 and preferably of up to 0.90 or up to 0.85 or up to 0.80 or up to 0.75, and 3.) a solar reflectance index SRI calculated in accordance with ASTM E 1980-01 preferably of at least 40% or of at least 60% and preferably of up to 95% or up to 90% or up to 86% or up to 82% or up to 78% or up to 72% or up to 66%. Such ranges are especially preferred for metallic surfaces resp. metallic substrates, but may be often gained for other types of surfaces resp. substrates too.

These values are directed to a coating before aging by solar terrestrial irradiance, but may be of similar or identical values if there has been some solar terrestrial irradiance. The solar reflectance index SRI of at least 40% refers especially to non-metallic substrate materials.

In comparison thereto, many muscovite pigments have a TE value of about 0.82. SRI is calculated from the TE and TSR data. TSR data are measured with a Bruker IFS 28 FTIR Spectrometer of Heat Island Group or measured with a portable Solar Spectrum Reflectometer Version 6.0 of Devices & Services Co., Dallas, whereas TE data are measured with an Emissometer Model AE1 of Devices & Services Co., Dallas.

Especially preferred thermal properties have shown to be gained, when the composition for generating the emissive coating according to the invention has been applied on at least one metallic material, especially if there are surfaces of different metallic materials. Such data gained were often in the following ranges: TE 0.40 to 0.90 or 0.55 to 0.90, TSR 0.40 to 0.80 or 0.55 to 0.80 and/or SRI 60 to 100%.

Especially preferred thermal properties have shown to be gained, especially when the composition for generating the emissive coating or the coating or both according to the invention has/have a weight ratio of the content of sheet silicate to binder in the range of from 0.5:1 to 1.5:1 or of from 0.75:1 to 1.1:1. The higher the ratio of sheet silicate to binder is selected, it allows for low total coating weight and thinner coatings for the equivalent TE. There occurs a saturation point for the thermal emissivity TE often at about 0.90 of the emissive coating, if this ratio is increased or if the coating thickness and at the same time the coating weight are increased. If this saturation point is once reached, it is typically maintained independent from the further increase of the sheet silicate concentration, of the above mentioned ratio and/or of the coating thickness and coating weight, the TE is typically not altered.

The generally preferred thermal data gained, especially on metallic surfaces resp. metallic substrates, were often in the following ranges: TE of from 0.60 to about 0.90 or to 0.92, TSR of from 0.65 to 0.75 and/or SRI of from 75 to 97%. These thermal data may be preferably gained for coating thicknesses in the range of from 0.6 to 15 μm. Of course, all these data depend considerably on coating weight and substrate quality.

Further generally preferred ranges are: TE of from 0.40 or of from 0.50 to 0.95 or to 0.90 or of from 0.60 to 0.85 or of from 0.70 to 0.80 or of from 0.55 to 0.75; TSR of from 0.40 or of from 0.55 to 0.90 or of from 0.60 to 0.85 or of from 0.70 to 0.80 and/or SRI of from 60 to 99% or of from 65 to 95% or of from 70 to 90% or of from 75 to 85 or to 80%.

Especially preferred thermal properties have shown to be gained, when the emissive coating according to the invention is applied on already painted surfaces on substrates of different materials like on glass substrates, metallic substrates and/or on plastic substrates, like on precoated metallic substrates, like on plastics' materials, like on paper or textile like materials, like on wood materials and like on any combination of different substrates. Such data gained were often in the following ranges: TE of from 0.40 or of from 0.60 to 0.90, TSR of from 0.65 to 0.80, SRI of from 75 to 100%, especially measured for a coating thickness of about 6 μm.

Especially preferred thermal properties have shown to be gained, when the emissive coating according to the invention was applied to glass surfaces and especially to clear and nearly or totally non-colored glass surfaces.

Such data gained were often in the following ranges: TE of from 0.70 to 0.95, TSR of from 0.07 to 0.10, SRI of from −10 to +9%, especially measured for a coating thickness of about 4 to 7 μm. The TSR data of the glass are often very low. These data depend significantly on color, transparency and clearness of the glass and on the background of the glass.

Especially preferred thermal properties have shown to be gained, when the emissive coating according to the invention on plastics' materials surfaces. Such data gained were in the following ranges: TE of from 0.60 to about 0.92, TSR of from 0.55 to 0.80, SRI of from 60 to 100%, especially measured for a coating thickness of about 10 μm.

Especially preferred thermal properties have shown to be gained, when the emissive coating according to the invention on white or cream colored paper surfaces. Such data gained were often in the following ranges: TE of from 0.65 to 0.85, TSR of from 0.70 to 0.80, SRI of from 80 to 90%, especially measured for a coating thickness of about 4 to 7 μm.

Especially preferred thermal properties have shown to be gained, when the emissive coating according to the invention on wood surfaces. Such data gained were in the following ranges: TE of from 0.60 to about 0.92, TSR of from 0.30 to 0.80, SRI of from 30 to 100%, especially measured for a coating thickness of about 10 μm.

In a preferred embodiment of the present invention, the cool element may have either A) an emissive coating with a gradient towards the outer surface with an increasing content of a silane or of a polysiloxane or of a fluorine compound or of any combination thereof towards its surface or with a gradient with an increasing hydrophobicity towards its surface or it may be hydrophobic itself or it may have a surface showing characteristics of a lotus effect surface or any combination thereof, or the cool element may have B) additionally upon the emissive coating or below the emissive coating, a layer with a content of silane, siloxane or polysiloxane or any combination thereof or with a hydrophobicity or with a surface showing characteristics of a lotus effect surface or any combination of these.

In case A), the emissive coating may show a gradient towards the outer surface with an increasing content of a silane or of a siloxane or of a polysiloxane, of a fluorine compound or of any combination thereof towards its surface or may show a gradient with an increasing hydrophobicity towards its surface or may be hydrophobic itself or may have a surface showing characteristics of a lotus effect surface or any combination thereof. The hydrophobic properties of the emissive coatings are preferably generated with the aid of any silane, of any siloxane, of any polysiloxane, of any fluorine compound or of any combination thereof. The lotus effect may be generated either by hydrophobic effect at the surface or by its specific microstructure or by both.

Especially in case B), the additional layer upon or below the emissive coating may have at least one UV absorbing substance to be well protected against UV degradation and to protect the underlying layers, coatings and substrates.

According to the present invention, there is a method of use of clear or translucent and colorless or nearly colorless emissive coatings on any surfaces for cool elements like cool roofing elements, on exterior elements of aeroplanes, of automobiles, of bicycles, of ships, of trains, of rockets, of satellites, of exterior antennae, of architectural exterior elements, of guard-rail elements, of tanks and of exterior chemical plant elements.

According to the present invention, there is a method of use of an emissive coating on any surface for a cool element or for the protection of an inflammable material or both like on organic or inorganic foils, on papers, on plastics' materials, on fibers' containing materials, on textile materials or on wood containing materials. Such emissive coatings need not to be clear or translucent or colorless. Such emissive coatings may be optimized to contain substances that do not only hinder inflammability of the coated substrate, but that may contain substances or a predominant content of substances in the coating that hinder inflammability or that are not be able to burn themselves. Preferably, such coatings are as closed and are themselves as stable, that a) at least some of their substances contained either react in case of heat to high heat stable substances or are heat stable to temperatures of at least 800° C. for some hours or both or b) that the coating maintains essentially its structure at least for some hours if there is high heat or pressure or both, e.g. in case of an accident. Such protected materials may be significantly helpful to avoid further damage in case of accidents e.g. of any transportation units.

Further on, according to the present invention, there is a method of use of a clear or translucent and colorless or nearly colorless emissive coating on any surface as clear coating or top coating in a paint system, especially for architectural application, for automobile industry, for recreation industry like for motorhomes and travel trillers. The emissive coating of the present invention may be taken instead of the conventional clear coating or top coating of automobiles and other objects. In alternative thereto, the emissive coating of the present invention may be additionally applied on a paint layer or a paint multilayer of a paint system. This has the advantage that the values of TE, TSR and SRI are significantly enhanced of up to about 40% and improved. Further on, it is possible to protect an existing paint layer or existing paint system thermally or for UV degradation or both by the additional application of an emissive coating of the present invention.

Finally, for reasons of paint repair especially of cars, a clean wipe releasing no fibers and no pieces of fluff may be taken which is impregnated with pure water so that it is wet. This wet clean wipe may be used to wipe along the whole area to be repaired to clean this area thoroughly from dust. Then these areas may be dried with a further clean wipe so that there is no or only a very thin water film remaining. Then, immediately after cleaning, the composition of the emissive coating may be applied to the area to be repaired to generate a repair coating with the composition according to the invention on the freshly prepared and clean area. In alternative, the component which paint shall be repaired, may be conventionally cleaned in other ways. Further on, the composition of the emissive coating, which is a repair coating composition, may be applied by using a tool like a brush, like a sponge, like a tampon, like a stick or like a wipe or like a gel-pack or may be sprayed.

Finally, there is a method of use of a clear or translucent or milky and colorless or nearly colorless composition for generating a clear or translucent or milky and colorless or nearly colorless emissive coating on any glass window, wherein the emissive coating protects an element or a space behind the window thermally like a window of a building, of an aeroplane, of an automobile, of a ship or of a train. Such coatings generated on glass windows have the advantage of ease of application in comparison to existing coatings and coverings of the state of the art. Inclusion of low transmittance and/or colored polymer may be used for controlled opacity, transparency and transmittance. This would improve and increase the total solar reflectance TSR without affecting the thermal emissivity TE.

It was surprising that it was possible to gain a thermal emissivity TE on coated metallic surfaces of about 0.6 and even of about 0.9.

It was further on surprising that sheet silicate pigments improve very much the thermal emissivity TE, so that a clear organic polymeric coating on metallic surfaces which typically has a thermal emissivity TE of only 0.18 to 0.20 may gain a thermal emissivity TE of from about 0.5 to about 0.9 only by addition of sheet silicate pigments.

In a similar way, it was surprising that sheet silicate pigments did not considerably alter the total solar reflectance TSR of a clear or translucent emissive coating, but very much the thermal emissivity TE: A clear unpigmented organic polymeric coating on a metallic surface typically shows a thermal emissivity TE of from about 0.06 to about 0.25 and a total solar reflectance TSR of about 0.45 to about 0.80 for a coating thickness of about 6 µm. This type of coating on a metallic surface may then gain a high thermal emissivity TE only by having added sheet silicate pigments to the composition and by being according to the invention, so that the thermal emissivity TE is often in the range of from about 0.60 to about 0.92 and so that the total solar reflectance TSR is often in the range of from about 0.60 to about 0.80 for the same coating thickness of about 6 µm and under comparable conditions.

Further on, it was surprising that sheet silicate pigments improve the solar reflectance index SRI considerably, so that a clear organic polymeric coating on metallic surfaces which typically has a solar reflectance index SRI of only 37 to 79% may gain a solar reflectance index SRI of from about 60 to about 98% only by addition of sheet silicate pigments for a coating thickness of about 6 µm.

Further on, it was surprising that the thermal properties further improved, if a coating of a certain thickness with the same proportion of sheet silicate was generated, as it is shown in Table 4, or if a coating of the same coating thickness, but with a higher proportion of sheet silicate was generated. This improvement continues until a certain high saturation point.

Further on, it was surprising that sheet silicate pigments improve considerably the corrosion resistance obviously in all types of corrosion tests, so that a clear organic polymeric coating on metallic surfaces which typically has a corrosion resistance of e.g. in a 200 to 500 hours—depending on thickness and binder quality—with <5% white rust tested with Neutral Salt Spray Test NSS in accordance with ASTM B 117, which may gain then a corrosion resistance by addition of sheet silicate pigments e.g. of from about 800 to 2.000 hours with <5% white rust tested with Neutral Salt Spray Test NSS in accordance with ASTM B 117.

Further on, it was surprising that sheet silicate pigments improved the paint adhesion of organic polymeric coatings in such way that corrosion at the scribe was significantly reduced.

Further on, it was surprising that sheet silicate pigments added to the coating did not result in defects affecting corrosion resistance and other properties.

It was very astonishing that an existing paint coating, which was overcoated with a clear emissive coating according to the invention having a thickness of e.g. only 3 µm improved the thermal emissivity TE from 0.20 to 0.35 and the solar reflectance index SRI even from 35 to 44 in %, whereas total solar reflectance TSR was not affected. But if the same paint coating was overcoated with the same type of emissive coating having a thickness of about 20 µm, the thermal emissivity TE improved from 0.20 to 0.87 and the solar reflectance index SRI even improved from 35 to 85%, whereas the total solar reflectance TSR was still not affected.

It was astonishing that the overcoating of paint coatings of all kinds improved the thermal emissivity TE, the solar reflectance SRI and the corrosion resistance significantly, so that it is easily possible and it is possible without high costs to optimize the thermal properties e.g. of automobiles, even if its production is already finished or even it is already in use.

It was found unexpectedly excellent that the generated clear coatings did not diminish the spangle of the metallic substrate, especially on Galvalume® and other aluminum rich or zinc rich materials. But astonishingly, the impression of the different crystals and further structural details of the metallic material were even increasingly seen in comparison to most other clear or translucent coatings of the state of the art on such materials.

It was further on found that this clear emissive coating can be applied without any special equipment e.g. in a steel mill, which is significantly advantageous for cost.

EXAMPLES AND COMPARISON EXAMPLES

The examples and comparison examples described in the following are intended to elucidate the subject-matter of the invention in more detail. The specified concentrations and compositions relate to the composition as used in the bath or as added to the bath or both and need not be identical with the initial solutions/dispersions of mostly higher concentrations (concentrates) or with the replenishing solutions/dispersions to replenish the consumption of chemical constituents in the bath. Commercially available steel panels of hot dip galvanized steel (HDG) G70 and panels of Galvalume® (55% AlZn) were used for the following experiments and tests.

First, the panels were degreased in an alkaline spray cleaner. Then, all kinds of panels as mentioned above were treated with a composition as shown in Table 3. Their ingredients used are shown in Table 2. In this treatment, a defined quantity of the composition (bath dispersion) was applied in such a way with the aid of a roll coater that a wet film thickness e.g. of about 21 g/m² arose. The composition was applied at a temperature of about 20° C. with a velocity of about 220 m/min. Subsequently, the wet film was dried at a temperature of about 65.5° C. (150 F) PMT (peak-metal-temperature) which needs about 140° C. of a laboratory convection oven for 25 seconds of time in the oven. The dry films (=the emissive coatings) showed a coating weight mostly in the range of about 8 to 12 g/m². The applied sheet silicate pigments were such on the base of different types of muscovite and of clays.

TABLE 2

Composition and properties of the different raw materials and ingredients used:

| Amount in g/L | Composition and approximate data of properties: |
|---|---|
| AR | Hydroxylated acrylic emulsion, MFT about 44° C., $T_g$ about 35° C., Hydroxyl Equivalent Weight HEW of about 1810 |
| EAA1 | Ethylene acrylic copolymer based dispersion, melting point 77° C., melt index 300, molecular weight about 8000, $T_g$ about −8° C. |
| MAA | Modified anionic acrylic resin, $T_g$ about 35° C., MFT about 30° C., relatively hard |
| CPU | Cationic polyurethane with a content of polycarbonate polyol, MFT about −5° C., elasticity about 13 |
| PUAR | Self-crosslinking polyurethane acrylic acid copolymer dispersion, $T_g$ about 52° C. |
| PUD | Polyurethane dispersion, $T_g$ about 42° C. |
| FP | Fluoropolymer |
| SSD1 | Sheet silicate dispersion of SSP6 metal oxide treated mica and synthetic sheet silicate SSP5, $d_{50}$ = 5 μm |
| SSD2 | Sheet silicate dispersion of SSP1 natural mica and synthetic sheet silicate, $d_{50}$ = 20 μm |
| SSD3 | Sheet silicate dispersion of SSP1 natural mica, $d_{50}$ = 20 μm |
| SSD4 | Sheet silicate dispersion of SSP2 natural mica, $d_{50}$ = 5 μm |
| SSD5 | Sheet silicate dispersion of SSP3 natural mica, $d_{50}$ = 10 μm |
| SSD6 | Sheet silicate dispersion of SSP4 natural mica, but $d_{50}$ = 30 μm |
| SSD7 | Sheet silicate dispersion of SSP5 synth. Sheet silicate, $d_{50}$ = 0.02 μm |
| SSP1 | Sheet silicate pigment 1 natural mica, $d_{50}$ = 20 μm |
| SSP2 | Sheet silicate pigment 2 natural mica, $d_{50}$ = 5 μm |
| SSP3 | Sheet silicate pigment 3 natural mica, $d_{50}$ = 10 μm |
| SSP4 | Sheet silicate pigment 4 natural mica, $d_{50}$ = 30 μm, silane-treated |
| SSP5 | Sheet silicate pigment 5 synthetic sheet silicate, $d_{50}$ = 0.02 μm |
| SSP6 | Sheet silicate pigment 6, Metal oxide treated mica, $d_{50}$ = 5 μm |
| A1 | Ammonia |
| A2 | Alkanolamine 1 |
| A3 | Alkanolamine 2 |
| Add 1 | Wax 1 |
| Add 2 | Wax 2 Dispersion |
| Add 3 | Wax 3 Dispersion |
| Add 4 | Sum of Defoamers 1-3 |
| Add 5 | $CeO_2$ nanoparticles |
| Add 6 | Wetting agent |
| Add 7 | Sum of Cosolvents 1-2 |
| Add 8 | Thixotrope on the base of methacrylic acid-acrylic ester copolymer |
| Add 9 | Zinc phosphate |
| Add 10 | Acid |
| Add 11 | Calcium silicate |
| Add 12 | Carboxylic acid as complexing agent |
| Add 13 | Glycol ether with at least 6 carbon atoms |
| Add 14 | Strongly acidic mixture of a zinc phosphate, $H_2TiF_6$, an aminosilane, ammonium and a complexing agent |

TABLE 2-continued

Composition and properties of the different raw materials and ingredients used:

Amount in g/L  Composition and approximate data of properties:

S 1         Epoxysilane
S 2         Aminosilane
S 3         blocked aminosilane
CL          Zirconium ammonium carbonate crosslinker
CH 1        Chelate 1
CH 2        Chelate 2
CR          Ammonium dichromate
DI-water    Media

TABLE 3

Composition of the bath liquids of inventive examples E and of comparison examples CE, process data and properties of the resulting coatings

| | Unit | E1 | E2 | E3 | CE1 | E4 | E5 | E6 | E7 | E8 | E9 |
|---|---|---|---|---|---|---|---|---|---|---|---|
| AR | g/L | | | | | 100.0 | 30.82 | | | | |
| EAA1 | g/L | 144.79 | 195.27 | 119.61 | 191.65 | | 206.27 | 188.22 | 185.90 | 184.63 | 144.66 |
| PUAR | g/L | | | | | 386.3 | | | | | |
| SSD Type | | 3 | 3 | 3 | | 2 | 1 | 1 | 2 | 2 | 3 |
| SSD Quantity | g/L | 484.2 | 312.3 | 643.5 | | 220.0 | 137.0 | 425.0 | 419.8 | 268.5 | 483.8 |
| SSP Type | | 1 | 1 | 1 | | 1 | 6 | 6 | 1 | 1 | 1 |
| SSP Quantity | g/L | 185.5 | 119.6 | 246.5 | | 85.8 | | | 163.7 | 104.7 | 186.3 |
| A1 | g/L | 8.25 | 11.13 | 6.82 | 10.92 | | 11.75 | 10.73 | 10.59 | 10.52 | 8.24 |
| A2 | g/L | 10.75 | 14.50 | 8.88 | 14.23 | | 15.32 | 13.98 | 13.81 | 13.71 | 10.74 |
| Add 1 | g/L | 12.63 | 12.11 | 10.43 | 11.90 | | 13.70 | | | 11.41 | 12.62 |
| Add 2 | g/L | | | | | | | | | 5.30 | |
| Add 3 | g/L | | | | | 25.33 | | | | | |
| Add 4 | g/L | 1.65 | 2.23 | 1.36 | 2.18 | 1.00 | 2.35 | 2.14 | 2.12 | 2.11 | 1.65 |
| Add 5 | g/L | | | | | 8.73 | | | | | |
| Add 6 | g/L | | | | | 1.33 | | | | 4.70 | |
| Add 7 | g/L | | | | | 12.66 | | | | | |
| Add 8 | g/L | | | | | 3.33 | | | | | |
| CL | g/L | | | | 15.00 | 8.80 | 9.59 | | | | |
| CH 1 | g/L | 11.58 | 10.64 | 9.57 | 10.00 | 8.67 | 13.70 | | | | 11.57 |
| CH 2 | g/L | 62.20 | 58.22 | 51.38 | | | | | | 50.20 | 62.15 |
| Sum without Di-water | g/L | 458.3 | 417.1 | 512.9 | 215.5 | 361.2 | 325.0 | 428.8 | 423.6 | 385.3 | 457.9 |
| Di-water | g/L | 644.7 | 694.2 | 641.8 | 784.6 | 745.0 | 706.7 | 688.2 | 679.7 | 675.9 | 644.1 |
| Sum | g/L | 1103.0 | 1111.3 | 1154.7 | 1000.1 | 1106.2 | 1031.7 | 1117.0 | 1103.3 | 1061.2 | 1102.0 |
| Sum without Di-water | % | 41.6 | 37.5 | 44.4 | 21.5 | 32.7 | 31.5 | 38.4 | 38.4 | 36.3 | 41.6 |
| P/B = pigmt.:binder weight ratio | | 0.81 | 0.49 | 1.08 | 0.08 | 0.59 | 0.30 | 0.72 | 0.65 | 0.46 | 0.81 |
| PVC = pigment:binder vol. ratio | | 0.25 | 0.17 | 0.30 | 0.06 | 0.27 | 0.13 | 0.21 | 0.20 | 0.18 | 0.25 |
| Solids' content in liquid compos. | g/L | 443.3 | 400.8 | 489.5 | 204.9 | 350.8 | 311.1 | 419.0 | 413.1 | 372.2 | 442.9 |
| Mica | g/L | 185.5 | 119.6 | 246.5 | | 85.8 | 53.4 | 165.7 | 163.7 | 104.7 | 186.3 |
| Clay | g/L | | | | | 41.8 | 26.0 | 80.8 | 79.8 | 51.0 | |
| Binder | g/L | 215.0 | 240.6 | 212.9 | 191.6 | 150.7 | 206.3 | 188.2 | 185.9 | 184.6 | 217.2 |
| Solids' content in liquid compos. | wt. % | 40.2 | 36.1 | 42.4 | 20.5 | 31.7 | 30.2 | 37.5 | 37.4 | 35.1 | 40.2 |
| Mica | wt. % | 16.8 | 10.8 | 21.3 | | 7.8 | 5.2 | 14.8 | 14.8 | 9.9 | 16.9 |
| Clay | wt. % | | | | | 3.8 | 2.5 | 7.2 | 7.2 | 4.8 | |
| Binder | wt. % | 19.5 | 21.6 | 18.4 | 19.2 | 13.6 | 20.0 | 16.8 | 16.8 | 7.4 | 19.7 |
| Contents in the coatings: | | | | | | | | | | | |
| Sheet silicate pigment of the film | wt. % | 41.8 | 29.8 | 50.4 | | 36.4 | 25.5 | 58.8 | 58.9 | 41.8 | 42.1 |
| Mica in film | wt. % | 41.8 | 29.8 | 50.4 | | 24.5 | 17.2 | 39.5 | 39.6 | 28.1 | 42.1 |
| Clay in film | wt. % | | | | | 11.9 | 8.4 | 19.3 | 19.3 | 13.7 | |
| Binder of the film | wt. % | 48.5 | 60.0 | 43.5 | 93.5 | 43.0 | 66.3 | 44.9 | 45.0 | 49.6 | 49.0 |
| Properties of compositions: | | | | | | | | | | | |
| Zeta potential | mV | −51.2 | −41.7 | −41.6 | −56.5 | −48.6 | −46.0 | −45.8 | −42.9 | −38.0 | −54.4 |
| Particle size of pigments d$_{50}$ | μm | 24.3 | 26.9 | 2.7 | 0.6 | 24.9 | 6.7 | 5.5 | 28.9 | 34.2 | 13.5 |
| pH value | | 8.7 | 8.4 | 8.6 | 8.3 | 8.4 | 8.7 | 8.7 | 8.7 | 8.5 | 8.6 |
| Viscosity | cps | 75 | 56 | 95 | 25 | 20 | 99 | 81 | 120 | 52 | 45 |
| Storage instability (gel effect) | | none | none | none | none | none | none | none | none | none | none |
| Composition stable at 38° C. over | months | 6 | 6 | 3 | 6 | 9 | 6 | 3 | 3 | 6 | 6 |

TABLE 3-continued

Composition of the bath liquids of inventive examples E and of comparison examples CE, process data and properties of the resulting coatings

| | | | | | | | | | | |
|---|---|---|---|---|---|---|---|---|---|---|
| Drying temperature p.m.t. | °C. | 180-220 | | | | | | | | |
| Dry film coating weight | g/m² | 5-20, which films are used for all properties, mostly at about 5 | | | | | | | | |
| Color tint of the coating | | very slight amber tint | | | | | | | | |
| Visual appearance of coatings | | all clear, colorless and without flaws | | | | | | | | |
| Salt Spray Test ASTM B 117, 1000 h required with <5% face corrosion | h | 1000 | 1000 | 1000 | 500 | 500 | 500 | 500 | 500 | 1000 | 1000 |
| Wet Stack Test ASTM D 7376, 2000 h required with <5% face corrosion | h | 2000 | 2000 | 2000 | 2000 | 2000 | 1500 | 1500 | 1500 | 2000 | 2000 |
| Butler Water Immersion Test ASTM A 239, 2000 h required with no blackening | h | 2000 | 2000 | 2000 | 2000 | 2000 | 750 | 750 | 750 | 2000 | 2000 |
| Humidity Test ASTM D 1735, 1000 h required with 0% face corrosion | h | 1000 | 1000 | 1000 | 1000 | 1000 | 750 | 750 | 750 | 2000 | 1000 |
| Q-Panel QUV Test over 2400 hours for polymer | h | passed | passed | passed | passed | passed | passed | passed | passed | passed | passed |

Uncoated Galvalume ® substrate:

| | | |
|---|---|---|
| Thermal Emissivity/substrate | TE | 0.75 |
| Total Solar Reflectance/substrate | TSR | 0.68 |
| Solar Reflective Index/substrate | % SRI | 79 |

Coated Galvalume ® substrate:

| | | | | | | | | | | |
|---|---|---|---|---|---|---|---|---|---|---|
| Thermal Emissivity for 7.0 g/m² | TE | 0.62 | 0.59 | 0.72 | n.d. | 0.53 | 0.57 | 0.58 | 0.49 | 0.59 | 0.62 |
| Thermal Emissivity for 10.8 g/m² | TE | 0.72 | 0.69 | 0.80 | n.d. | 0.63 | 0.67 | 0.66 | 0.57 | 0.69 | 0.72 |
| Thermal Emissivity for 16.2 g/m² | TE | 0.85 | 0.82 | 0.88 | n.d. | 0.74 | 0.75 | 0.74 | 0.68 | 0.82 | 0.85 |
| Coating weight on Galvalume ® | g/m² | 7.64 | 6.82 | 6.95 | 1.61 | 5.79 | 5.88 | 6.93 | 7.30 | 7.79 | 7.00 |
| Thermal Emissivity/substrate | TE | 0.60 | 0.55 | 0.72 | 0.27 | 0.48 | 0.49 | 0.58 | 0.56 | 0.65 | 0.61 |
| Total Solar Reflectance/substrate | TSR | 0.68 | 0.68 | 0.67 | 0.68 | 0.68 | 0.68 | 0.68 | 0.67 | 0.67 | 0.68 |
| Solar Reflective Index/substrate | % SRI | 75 | 74 | 77 | 63 | 71 | 72 | 75 | 72 | 75 | 75 |

Colorimeter measurements: Uncoated Galvalume ® as standard STD

| | | | | | | | | | | |
|---|---|---|---|---|---|---|---|---|---|---|
| L - STD 74.39 | | 76.74 | 76.81 | 75.03 | 76.47 | 74.88 | 75.67 | 75.99 | 75.51 | 75.30 | 76.34 |
| a - STD −1.64 | | −1.40 | −1.12 | −0.99 | −0.77 | −1.19 | −0.97 | −0.96 | −0.86 | −1.02 | −0.94 |
| b - STD −0.93 | | −0.54 | −1.84 | −2.00 | −1.84 | −0.98 | −1.67 | −2.21 | −2.07 | −1.81 | −1.78 |
| Static coefficient of friction | | 0.20 | 0.18 | 0.17 | 0.22 | 0.20 | 0.21 | 0.21 | 0.21 | 0.19 | 0.19 |
| Draw bead friction GM 9053P | | 0.30 | 0.25 | 0.25 | 0.20 | 0.22 | 0.22 | 0.22 | 0.22 | 0.22 | 0.24 |
| Coating thickness | μm | 6-9 | 6-9 | 6-9 | 1-1.2 | 6-9 | 6-9 | 6-9 | 6-9 | 6-9 | 6-9 |

| | | Example/Comparison Example | | | | | | | | | |
|---|---|---|---|---|---|---|---|---|---|---|---|
| | Unit | E10 | E11 | E12 | E13 | E14 | E15 | E16 | E17 | E18 | E19 |
| EAA1 | g/L | 186.51 | 186.7 | 186.9 | 186.9 | 125.0 | 98.8 | 189.4 | 198.50 | | |
| MAA | g/L | | | | | | | | | | 365.40 |
| CPU | g/L | | | | | | | | | | 365.40 |
| FP | g/L | | | | | | | | | 739.76 | |
| SSD Type | | 3 | 4 | 5 | 6 | 4 | 7 | 3 | 3 | | 2 |
| SSD Quantity | g/L | 298.3 | 298.7 | 299.1 | 299.1 | 454.6 | 574.8 | 275.5 | 326.84 | | 268.5 |
| SSP Type | | 1 | 2 | 3 | 4 | 2 | 5 | 1 | 1 | 1 | 1 |
| SSP Quantity | g/L | 114.8 | 115.0 | 115.2 | 115.2 | 175.0 | 160.9 | 104.7 | 124.2 | 170.15 | 104.7 |
| A1 | g/L | 10.63 | 10.64 | 10.66 | 10.66 | 7.10 | 5.64 | 10.81 | 11.33 | | |
| A2 | g/L | 13.85 | 13.87 | 13.89 | 13.89 | 9.30 | 7.33 | 14.05 | 14.74 | | |
| Add 1 | g/L | 11.53 | 11.54 | 11.56 | 11.56 | 7.70 | 6.11 | 11.71 | | | 54.00 |
| Add 4 | g/L | 2.13 | 2.13 | 2.13 | 2.13 | 1.50 | 1.19 | 2.30 | 1.31 | 1.48 | 6.60 |
| Add 6 | g/L | | | | | | | | | | 4.80 |
| Add 7 | g/L | | | | | | | | | 55.48 | |
| Add 11 | g/L | | | | | | | | 5.51 | | |
| Add 12 | g/L | | | | | | | | | | 10.20 |
| Add 13 | g/L | | | | | | | | | | 16.80 |
| Add 14 | g/L | | | | | | | | | | 376.20 |
| CH 1 | g/L | 10.17 | 10.18 | 10.20 | 10.20 | 11.00 | 10.78 | 21.35 | | | |
| CH 2 | g/L | 55.59 | 55.67 | 55.74 | 55.74 | 60.00 | 53.89 | 5.17 | | | |
| CR | g/L | | | | | | | | 10.68 | | |
| Sum without Di-water | g/L | 398.3 | 398.8 | 399.4 | 404.4 | 415.0 | 344.6 | 408.35 | 385.67 | 597.02 | |
| Di-water | g/L | 663.0 | 663.9 | 664.8 | 659.8 | 691.7 | 664.4 | 650.85 | 681.79 | 591.78 | |
| Sum | g/L | 1061.3 | 1062.7 | 1064.2 | 1064.2 | 1106.7 | 1009.0 | 1059.2 | 1067.46 | 1188.80 | |
| Sum without Di-water | % | 37.5 | 37.5 | 37.5 | 38.0 | 37.5 | 34.1 | 38.6 | 36.13 | 50.22 | |
| P/B = pigmt.:binder weight ratio | | 0.49 | 0.49 | 0.49 | 0.49 | 0.83 | 1.32 | 0.50 | 0.51 | 0.46 | 0.21 |

TABLE 3-continued

Composition of the bath liquids of inventive examples E and of comparison examples CE, process data and properties of the resulting coatings

| | | | | | | | | | | | |
|---|---|---|---|---|---|---|---|---|---|---|---|
| PVC = pigment:binder vol. ratio | | 0.17 | 0.17 | 0.17 | 0.17 | 0.24 | 0.56 | 0.17 | 0.15 | 0.17 | |
| Solids' content in liquid compos. | g/L | 382.8 | 383.3 | 383.8 | 383.8 | 401.6 | 366.27 | 372.2 | 373.93 | 541.50 | |
| Mica | g/L | 114.8 | 115.0 | 115.2 | 115.2 | 175.0 | | 104.7 | 124.20 | 170.15 | 104.7 |
| Clay | g/L | | | | | | 160.9 | | | | 51.0 |
| Binder | g/L | 231.2 | 198.8 | 199.1 | 199.1 | 137.2 | 136.5 | 189.4 | 247.33 | 371.38 | 730.8 |
| Solids' content in liquid compos. | wt. % | 36.1 | 36.1 | 36.1 | 36.1 | 36.3 | 36.3 | 35.2 | 35.03 | 45.55 | |
| Mica | wt. % | 10.8 | 10.8 | 10.8 | 10.8 | 15.8 | | 9.9 | 11.64 | 14.31 | |
| Clay | wt. % | 0 | | | | | 14.5 | | | | |
| Binder | wt. % | 21.8 | 18.7 | 18.7 | 18.7 | 12.4 | 12.3 | 17.9 | 23.17 | 31.24 | |
| Contents in the coatings: | | | | | | | | | | | |
| Sheet silicate pigment of the film | wt. % | 30.0 | 30.0 | 30.0 | 30.0 | 43.6 | 50.1 | 28.1 | 33.21 | 31.42 | |
| Mica in film | wt. % | 30.0 | 30.0 | 30.0 | 30.0 | 43.6 | | 28.1 | 33.21 | 31.42 | |
| Clay in film | wt. % | | | | | | 50.1 | | | | |
| Binder of the film | wt. % | 60.4 | 51.9 | 51.9 | 51.9 | 34.2 | 43.0 | 50.8 | 66.14 | 68.58 | |
| Properties of compositions: | | | | | | | | | | | |
| Zeta potential | mV | −42.0 | −39.0 | −44.0 | −37.0 | −33.1 | −47.2 | −44.0 | −40.9 | −46.8 | |
| Particle size of pigments $d_{50}$ | μm | 15.5 | 5.8 | 11.3 | 32.3 | 7.5 | 6.9 | 27.3 | 28.3 | 27.3 | 15.5 |
| pH value | | 8.6 | 8.6 | 8.7 | 8.7 | 8.5 | 8.5 | 8.7 | 8.4 | 8.5 | 1.2 |
| Viscosity | cps | 32 | 38.5 | 40.0 | 42.5 | 80.0 | 94 | 78 | 63 | 96 | |
| Storage instability (gel effect) | | none | none | none | none | none | none | none | none | none | none |
| Stable composition at 38° C. over | months | 6 | 6 | 6 | 6 | 6 | 6 | 6 | 6 | 6 | >4 |
| Drying temperature p.m.t. | ° C. | | | | | 180-220 | | | | | |
| Dry film coating weight | g/m² | | | | 5-20, which films are used for all properties, mostly about 5 | | | | | | |
| Color tint of coatings | | | | | | very slight amber tint | | | | | |
| Visual appearance of coatings | | | | | all clear, colorless and without flaws | | | | | | |
| Salt Spray Test ASTM B 117, 1000 h with <5% face corrosion | h | 1000 | 1000 | 1000 | 1000 | 1000 | 350 | 1000 | 1000 | | |
| Wet Stack Test ASTM D 7376, 2000 h required with <5% face corrosion | h | 2000 | 2000 | 2000 | 2000 | 2000 | 750 | 2000 | 2000 | | |
| Butler Water Immersion Test ASTM A 239, 2000 h required with no blackening | h | 2000 | 2000 | 2000 | 2000 | 2000 | 1000 | 2000 | 2000 | | |
| Humidity Test ASTM D 1735, 1000 h required with 0% face corrosion | h | 1000 | 1000 | 1000 | 1000 | 1000 | 1000 | 2000 | 2000 | | |
| Q-Panel QUV Test over 2400 hours for polymer system | h | passed | passed | passed | passed | passed | passed | passed | | | |
| Uncoated Galvalume ® substrate: | | | | | | | | | | | |
| Thermal Emissivity/substrate | TE | | | | | 0.75 | | | | | |
| Total Solar Reflectance/substrate | TSR | | | | | 0.68 | | | | | |
| Solar Reflective Index/substrate | % SRI | | | | | 79 | | | | | |
| Coated Galvalume ® substrate: | | | | | | | | | | | |
| Thermal Emissivity for 7.0 g/m² | TE | 0.59 | 0.60 | 0.59 | 0.59 | 0.63 | 0.59 | 0.62 | 0.65 | 0.58 | |
| Thermal Emissivity for 10.8 g/m² | TE | 0.69 | 0.70 | 0.69 | 0.69 | 0.73 | 0.70 | 0.70 | 0.71 | 0.63 | |
| Thermal Emissivity for 16.2 g/m² | TE | 0.82 | 0.83 | 0.82 | 0.82 | 0.86 | 0.81 | 0.84 | 0.83 | 0.72 | |
| Coating weight on Galvalume ® | g/m² | 7.16 | 6.56 | 6.72 | 10.02 | 9.54 | 10.50 | 7.50 | 7.90 | 7.50 | |
| Thermal Emissivity/substrate | TE | 0.60 | 0.59 | 0.65 | 0.57 | 0.86 | 0.70 | 0.68 | 0.71 | 0.62 | |
| Total Solar Reflectance/substrate | TSR | 0.68 | 0.68 | 0.68 | 0.66 | 0.66 | 0.67 | 0.67 | 0.67 | 0.65 | |
| Solar Reflective Index/substrate | % SRI | 75 | 75 | 77 | 71 | 79 | 77 | 76 | 77 | 75 | |
| Colorimeter measurements: Uncoated Galvalume ® as standard STD | | | | | | | | | | | |
| L - STD 74.39 | | 75.93 | 77.40 | 76.62 | 73.79 | 77.63 | 77.52 | 76.40 | 76.30 | 73.50 | |
| a - STD −1.64 | | −0.71 | −1.19 | −0.93 | −1.36 | −1.07 | −1.36 | −1.04 | −1.50 | −1.11 | |
| b - STD −0.93 | | −0.61 | −1.99 | −1.93 | −0.51 | −0.63 | −1.19 | −1.71 | −2.33 | −3.01 | |
| Static coefficient of friction | | 0.19 | 0.19 | 0.19 | 0.19 | 0.19 | 0.18 | 0.18 | 0.19 | | |
| Draw bead friction GM 9053P | | 0.20 | 0.20 | 0.18 | 0.18 | 0.18 | 0.21 | 0.19 | 0.20 | | |
| Coating thickness | μm | 6-9 | 6-9 | 6-9 | 6-9 | 6-9 | 6-9 | 6-9 | 6-9 | 6-9 | 6-9 |

Only the non-gelled compositions were applied on the metal sheets by using a bar-coater. Therefore, examples for unstable compositions are not shown in Table 3. All compositions were applied in such way to give a dry coating in the range of from about 50 to about 200 g/m² depending on the concentration of the composition, mostly using more than 35% by weight of solid's content. If the solid's content was lowered, then the dry film thickness was lower, too. After the drying, the coated panels were inspected and tested.

Then, the forming operations were undertaken by the physical and environmental tests as listed in Table 3: The friction and wear characteristics were tested with the Interlaken Strip and Draw Bead Test. This test enables to check the friction coefficient and its change during mechanical attack by the clamp load applied to the coated sheet necessary to obtain the friction coefficient. The Interlaken Strip and Draw Bead correlates well with forming procedures in production having 1 to 20 steps of singular formings in succession. The test results for the coatings of the invention are excellent as there is a practically constant wear and friction behavior after the starting period which keeps typically the friction coefficient at about 0.17 to 0.30.

The following tests were performed exactly as described in the standards. The corrosion tests on not post-painted surfaces were conducted by measuring the face corrosion percentage. Concerning the corrosion resistance, there are significant differences in the performance, especially of the salt-spray test after 500 hours respectively after 750 hours, measured as % face corrosion. All the corrosion tests with coatings having a certain content of chromate exhibit an excellent corrosion resistance. The chromate-free coatings that have a content of the zirconium carbonate or/and chelate have an equivalent corrosion resistance in comparison to chromate containing coatings, so that they are really excellent.

It has now been found that the ionomeric materials are superior in corrosion resistance in comparison to other organic polymeric materials when the DSC melting peak of 75° C. is exceeded. Then the micelles coalesce thermally forming a very uniform pin hole free film.

The paint adhesion tests after the salt-spray test on the scribe and the cross hatch test before and after the humidity test according to DIN 50017 KK are performed. The coated panels could be then painted with a polyester based powder paint of about 50 μm coating thickness and could be heated so that this coating melted partially or totally and was cured at about 218° C. If the salt-spray test on the scribe shows a corrosion creep of 3 or 4 mm from the scribe and if the cross hutch test after the humidity test shows GT1, the requirements of the appliance industry are well met. Nearly all coatings show a good or excellent paint adhesion.

The emissive coating will in most applications not be overcoated, as the thermal properties of the emissive coatings are often then no longer strongly thermally effective and as the emissive coating would then primarily work as a primer and for corrosion resistance.

Further on, it was found that the film-forming temperature of the compositions with ionomerics, as used e.g. in the examples, is significantly lower than for most of the other organic polymeric materials, 72 to 82° C., and that a denser film may be generated than with most of the other organic polymeric materials, because the film coalesces without solvents, surfactants or plasticizers.

It has further been found that the addition of a UV absorbing agent reduces significantly the coloration of such organic coatings under sun light exposure (long-term outdoor exposure). This leads to the effect that there is no or nearly no discoloration of a coating exposed to sun light for one or several years because of the addition of the UV absorbing agent.

For specifying the color and its intensity, the CIE data system with L, a, b for the color scale for brightness as well as L for brightness, a for red-green shift and b for yellow-blue shift are used. The uncoated Galvalume® was measured as a reference for the effect of the emissive coating and showed the following data as standard: L=74.39, a=−1.64 and b=−0.93. The very small deviations from the standard data show the very small coloring effect of the emissive coatings.

The coatings generated according to the invention show a relatively low permeability. It may be measured as water vapor transmission rate WVTR according to ASTM E96, which typically shows at 38° C.<2.3 (g mil)/(100 in$^2$) in 24 h and at 1 atm, and/or as gas transmission rate GTR for oxygen, which typically shows <350 cm$^3$/(100 in$^2$) in 24 h and at 1 atm. The ionomeric polymer is further on resistant to Fungi growth. The films formed at proper temperature are dense, of low affectability and of excellent homogeneity. They reach a relatively high degree of coalescence although there had not been added any high temperature cross-linking agents as on the base e.g. of isocyanates.

Thermal Emissivity, Total Solar Reflectance, Solar Irradiance, Solar reflective Index The addition of sheet silicates increased the TE with very little to no effect on the TSR. There was a direct effect of the amount of sheet silicates added to the resulting TE at the same coating weight. The weight ratio of the sheet silicates to organic polymers in the applied film is the same or in about the same for all polymers that form a clear film and have a refractive index n similar to that of the sheet silicates, especially in the range of from 1.45 to 1.55. Other pigments such as titanium dioxide, carbon black etc. may increase the TE of the applied film too, but do not form a clear film obscuring the spangle of the substrate and can lower the TSR.

Only the non-gelled compositions were applied on the metallic sheets by using a bar-coater which offers a dry film in the range of about 1 to 2 g/m$^2$ (0.5 g/m$^2$) depending on the concentration of the composition, mostly using 35% by weight of solid's content. If the solid's content is lower then the dry film thickness is lower, too. After the drying, the coated panels were inspected and tested. Therefore, Table 3 does only show the non-gelled compositions.

Then, the forming operations were undertaken by the forming tests as listed in Table 3: The friction and wear characteristics were tested with the Strip Draw and Draw Bead Test according to Test Method GM 90053P. This test enables to check the friction coefficient and its change during mechanical attack by a high number of redraws on the coated sheet necessary to obtain a friction coefficient of about 0.18 to 0.25. Three or more draws characterize a coating that is extremely stable and provides an excellent forming effect. This test correlates well with forming procedures in production having 5 to 20 steps of singular formings in succession. The test results are excellent as there is a practically constant wear and friction behavior after the starting period which keeps typically the friction coefficient at about 0.2. Three or more draws characterize a coating that is extremely stable and provides an excellent forming effect.

The paint adhesion tests after the salt-spray test on the scribe and the cross hutch test before and after the humidity test according to DIN 50017 KK are performed without coating with a paint in a final step. If the salt-spray test on the scribe shows 3 or 4 and if the cross hutch test after the humidity test shows GT1, the requirements of the appliance industry are well met. Nearly all coatings show a good paint adhesion to all substrates, as Table 7 demonstrates.

Further on, it was found that the film-forming temperature is significantly lower than for most other organic polymeric materials and that there may be a certain self-healing effect for defects and that a denser film may be generated than with most other organic polymeric materials.

It has further been found that the addition of a UV absorbing agent reduces significantly the coloration of such organic coatings under sun light exposure (long-term outdoor exposure). Mica helps to prevent UV degradation of the organic polymer.

The coatings generated according to the invention show a relatively low permeability, are dense, of low affectability and of good homogeneity. They reach a relatively high cross-linking degree although there are not used any high temperature crosslinking agents added as on the base e.g. of isocyanates.

It has been found that the thermal properties of the emissive coatings of the present invention are even better, if the thickness of the applied emissive coating does not only have the minimum thickness—on metallic substrates as well as on other substrates. Table 4 shows the thermal properties of the coatings generated with the same composition according to the invention, but with a varied thickness of the emissive coating as prepared with the composition resp. measured with the coating on the base of example E8.

TABLE 4

Variation of the thermal properties of coatings prepared with the same liquid composition on Galvalume ® as used for example E8 by its thickness, wherein the data for SRI depend on the value of TE which depend on initial data of TRS of the Galvalume ®.

| Coating Thickness, μm | TE | TSR | SRI % - 0.66 | SRI % - 0.68 |
|---|---|---|---|---|
| 2.1 | 0.49 | 0.66 or 0.68 | 68 | 72 |
| 4.1 | 0.57 | 0.66 or 0.68 | 71 | 74 |
| 6.2 | 0.64 | 0.66 or 0.68 | 73 | 76 |
| 8.3 | 0.71 | 0.66 or 0.68 | 75 | 78 |
| 10.3 | 0.76 | 0.66 or 0.68 | 77 | 80 |
| 12.4 | 0.80 | 0.66 or 0.68 | 78 | 81 |
| 14.4 | 0.83 | 0.66 or 0.68 | 79 | 81 |
| 16.5 | 0.85 | 0.66 or 0.68 | 79 | 82 |
| 24.8 | 0.89 | 0.66 or 0.68 | 80 | 83 |
| 32 | 0.90 | 0.66 or 0.68 | 80 | 83 |
| 50 | 0.91 | 0,66 or 0.68 | 80 | 83 |

Table 4 shows that as the coating weight and coating thickness increases, the thermal emissivity TE reaches a saturation point. Generally, the trend for all compositions seems to be the same for the three thermal parameters.

It has been found that the thermal properties of the emissive coating of the present invention are even better, if the thickness of the applied emissive coating has a certain coating thickness. The average sheet silicate pigment particle size $d_{50}$ does not influence the thermal properties, if it is varied in the range of about 5 to 20 μm. Table 5 shows the thermal properties of the coatings generated with the same composition according to the invention.

TABLE 5

Variation of the thermal properties of coatings prepared with the same liquid composition on Galvalume ® as used for example E11, E12 or E13 by its thickness and pigment particle size

| Coating Thickness, μm | Sheet Silicate Pigment $d_{50}$, μm | TE | TSR | SRI % |
|---|---|---|---|---|
| 5 | 5 | 0.60 | 0.67 | 74 |
| 5 | 20 | 0.60 | 0.67 | 74 |
| 20 | 5 | 0.85 | 0.66 | 79 |
| 20 | 10 | 0.85 | 0.66 | 79 |
| 20 | 20 | 0.85 | 0.66 | 79 |
| 50 | 5 | 0.90 | 0.65 | 79 |

TABLE 5-continued

Variation of the thermal properties of coatings prepared with the same liquid composition on Galvalume ® as used for example E11, E12 or E13 by its thickness and pigment particle size

| Coating Thickness, μm | Sheet Silicate Pigment $d_{50}$, μm | TE | TSR | SRI % |
|---|---|---|---|---|
| 50 | 10 | 0.90 | 0.65 | 79 |
| 50 | 20 | 0.90 | 0.65 | 79 |

The trends for these three parameters as shown in Table 5 are probably the same for all compositions.

Table 6 shows an example of the thermal emissivity behavior of uncoated and of emissively coated clear colorless glass as used for glass windows. It demonstrates the very strong influence of the background behind the glass. The data of the coated samples are according to the invention. They show that the emissive coating of the invention harmonizes the thermal emissivity so that TE is independent from the background behind the glass and has very high data. But care has to be taken that the emissive coating of the present invention applied to glass is—if wanted—clear enough to be adequate to be used for normal windows.

TABLE 6

Thermal emissivity data for uncoated and for emissively coated glass depending on the background behind the glass, coated with the composition of example E8

| Window Glass Background: | Thermal Emissivity TE | | |
|---|---|---|---|
| | Only Background | Uncoated Glass | Coated Glass |
| Dark Background | 0.87 | 0.87 | 0.91 |
| White Background | 0.74 | 0.86 | 0.90 |
| Galvalume ® Background | 0.05 | 0.09 | 0.90 |
| Green Background | 0.16 | 0.19 | 0.90 |

Further Examples and Comparison Examples for other applications and other substrates: The results are shown in Table 7.

In a further example and comparison example, a metallic substrate painted with a three layer automobile paint system (primer, base coat, top coat) on a steel substrate has been coated with a composition according to example E8 above to generate an emissive coating.

In alternative thereto, a two layer automobile paint system (primer, base coat, but no top coat) on a steel substrate has been coated with a composition according to example E8 above to generate an emissive coating.

In alternative thereto, a three layer automobile paint system (primer, base coat, but no top coat) applied on a zinc-phosphated steel substrate has been sanded so that there was seen the fresh rough steel surface. This surface has then been repair-coated with a composition according to example E8 above to generate an emissive repair-coating. The emissive repair-coating of about 15 μm thickness showed a corrosion resistance not less than the corrosion resistance of the original three layer automobile paint system, as measured by ASTM B117 test.

In comparison to the coated metallic substrates, a typical glass window has been measured for thermal properties. Afterwards, it has been coated with a composition according to example E8 above to generate an emissive coating.

In comparison to the coated metallic substrates, a wood shake shingle as typically used for roofing has been measured for thermal properties. Afterwards, it has been coated with a composition according to example E8 above to generate an emissive coating.

TABLE 7

Variation of the thermal properties of coatings prepared with the same liquid composition on the base of the composition of example E8 for different applications and with in about the same coating properties of the emissive coating as in Table 3

| Ex./CE | Substrate | Adhesion of emissive coating | Emissive coating thickness, μm | TE | TSR | SRI % |
|---|---|---|---|---|---|---|
| CE2 | 3-layer painted steel | excellent | none | 0.52 | 0.59 | 58 |
| E20 | 3-layer painted steel | excellent | 5 | 0.60 | 0.59 | 61 |
| E21 | 2-layer painted steel | excellent | 10 | 0.75 | 0.58 | 65 |
| E22 | repair-sanded painted steel | excellent | 15 | 0.80 | 0.58 | 66 |
| CE3 | Clear window glass | — | none | 0.86 | n.a. | — |
| E23 | Clear window glass | excellent | 10 | 0.90 | n.a. | — |
| CE4 | Plastics - gray plastic facia | — | none | 0.84 | 0.57 | 66 |
| E24 | Plastics - gray plastic facia | excellent | 10 | 0.90 | 0.57 | 68 |
| CE5 | Wood shake shingle | — | none | 0.77 | 0.42 | 43 |
| E25 | Wood shake shingle | excellent | 10 | 0.88 | 0.41 | 46 |

The comparison examples CE2 to CE5 have the same liquid composition as example E8 with the exception that there is no content of sheet silicate pigments. For CE3 and for E23, TE was measured using a white background.

The invention claimed is:

1. A composition for applying a clear or translucent and colorless or nearly colorless emissive coating to a substrate surface, the composition consisting of:
    a) a binder consisting of: 50 to 300 g/L of ethylene acrylic copolymer;
    b) 30 to 300 g/L of mica;
    c) 0.05 to 30 g/L of an amine selected from the group consisting of N,N-dimethylisopropylamine, 2-[(1-methylpropyl)amino]ethanol, and combinations thereof;
    d) 0.05 to 150 g/L of at least one defoamer; and
    e) water;
    wherein the mica has a TE value in accordance with ASTM C-1371-04a for the thermal emissivity of at least 0.40 and a particle size distribution of which $d_{50}$ is in a range of from 0.4 μm to 60 μm;
    wherein the composition has a weight ratio of mica to binder in a range from 0.3:1 to 1:1; and
    wherein when the emissive coating is prepared from the composition, said emissive coating has a total solar reflectance TSR in accordance with ASTM C-1549-04 of at least 0.55, and a solar reflectance index SRI calculated in accordance with ASTM E 1980-01 of at least 40%.

2. The composition of claim 1, wherein the mica has a TE value in accordance with ASTM C-1371-04a for the thermal emissivity of between 0.6 and 0.9.

3. The composition of claim 1, having a film thickness of from 0.01 to 2000 μm.

* * * * *